United States Patent [19]

Asami et al.

[11] Patent Number: 5,546,122
[45] Date of Patent: Aug. 13, 1996

[54] FILM IMAGE INPUT SYSTEM

[75] Inventors: Katuo Asami; Hitoshi Yozawa, both of Tokyo, Japan

[73] Assignee: Fuji Photo Film Co., Ltd., Kanagawa, Japan

[21] Appl. No.: 165,711

[22] Filed: Dec. 13, 1993

Related U.S. Application Data

[62] Division of Ser. No. 755,210, Sep. 5, 1991, Pat. No. 5,309,242.

[30] Foreign Application Priority Data

| Sep. 14, 1990 | [JP] | Japan | 2-245114 |
| Sep. 14, 1990 | [JP] | Japan | 2-245115 |
| Sep. 14, 1990 | [JP] | Japan | 2-245116 |
| Sep. 14, 1990 | [JP] | Japan | 2-245117 |
| May 24, 1991 | [JP] | Japan | 3-120067 |
| Jun. 13, 1991 | [JP] | Japan | 3-142137 |
| Jun. 13, 1991 | [JP] | Japan | 3-142138 |
| Aug. 5, 1991 | [JP] | Japan | 3-195493 |

[51] Int. Cl.$^6$ .................................................. H04N 5/253
[52] U.S. Cl. .................................................. 348/96
[58] Field of Search ........................ 354/75, 76; 355/72, 355/75, 67, 68, 69, 113, 114; 348/373, 374, 375, 207, 96, 97, 98; 352/166, 167; 353/25, 26 A, 26 R, 27 A, 27 R, DIG. 2; 358/332, 344, 345, 347; H04N 5/253

[56] References Cited

U.S. PATENT DOCUMENTS

| 3,715,160 | 2/1973 | Fader | 355/113 |
| 4,506,300 | 3/1985 | Fearside | 348/335 |
| 4,603,966 | 8/1986 | Brownstein | 355/45 |
| 5,006,873 | 4/1991 | Wash | 354/207 |
| 5,309,242 | 5/1994 | Asami et al. | 348/97 |

FOREIGN PATENT DOCUMENTS

| 3-167972 | 7/1991 | Japan | H04N 5/253 |

*Primary Examiner*—Wendy Garber
*Assistant Examiner*—Tuan Y. Ho
*Attorney, Agent, or Firm*—Sughrue, Mion, Zinn, Macpeak & Seas; Richard C. Turner; Steven M. Gruskin

[57] ABSTRACT

This is a film image input system wherein an image of the developed still photo film is made to focus on an image sensing plane of a charge coupled device through a taking lens to be converted into electric signals and the electric signals are input in a video monitor. The film image input system comprises: a zoom driving part for changing the image magnification of the taking lens; a scan mechanism for moving an image taking position on the film by the taking lens; and a control part for controlling the scan mechanism in such a manner that the moving speed of the scan mechanism is decreased with the increase in the image magnification of the taking lens and making the moving speed of a screen on the video monitor constant during scan. Furthermore, the control part can restrict the scan scope of the scan mechanism in accordance with the image magnification, satisfactorily display the scope being picked up at present on a display device, and return the scan position to the center of the film and return the image magnification to a predetermined standard magnification so that the film image in the whole frame can occupy the whole screen of the video monitor, upon receiving the standard reproduction command.

5 Claims, 29 Drawing Sheets

324A 324B          324C 5,546,122

FILM IMAGE INPUT SYSTEM

This is a divisional of application Ser. No. 07/755,210 filed Sep. 5, 1991 U.S. Pat. NO. 5,309,242.

BACKGROUND OF THE INVENTION

1. Field of the Invention

This invention relates to a film image input system, and more particularly to a film image input system wherein an image of a developed still photo film is image-sensed by an image sensing means to be converted into electric signals and the electric signals are input into a video monitor, to thereby reproduce the image of the film on the video monitor.

2. Description of the Related Art

A film image input system wherein the image of the developed still photo film is reproduced on the video monitor has heretofore been known by U.S. Pat. No. 4,482,924, U.S. Pat. No. 4,485,406, U.S. Pat. No. 4,506,300, WO 90/04301 and so forth.

As shown in FIG. 35 for example, a film image input system 1 comprises: a film feeding system including a feed reel 3 for delivering a long film 2 of a developed still photo and a take-up reel 5, an image pick-up optical system 6 consisting of a lighting 6A and a taking lens 6B; an image sensor 7A such as a charge coupled device (CCD); and an image signal process circuit 7B.

The film is delivered frame by frame between the lighting unit 6A and the taking lens 6B. The image of the film 2 is illuminated by a light from the lighting unit 6A, and the image thus illuminated is picked up by the taking lens 6B and made to focus at the image sensor 7A. With this arrangement, the image on the film 2 is converted into electric signals in the image sensor 7A, signal-processed in the image signal process circuit, thereafter, output into a video monitor and reproduced on the video monitor 8. Furthermore, the film image input system of this type may include a zoom mechanism, a film scan mechanism (X-Y moving mechanism), an image sensor rotating mechanism and so forth.

Now, in the film image input system of this type, when the image of the film is scanned, a moving speed of a screen of the video monitor 8 during the scan is varied by the image magnification of the taking lens 6B. Namely, there have been such disadvantages that, when the image magnification of the taking lens 6B is large, the moving speed of the screen of the video monitor 8 is increased, and, when the image magnification of the taking lens 6B is small; the moving speed of the screen of the video monitor 8 is decreased. Furthermore, when the image of the film is scanned within one frame, the scan is performed by moving the film 2 and the image pick-up optical system 6 relatively to each other in a direction X or Y. However, the scan mechanism in the conventional film image input system cannot be moved in the directions X and Y simultaneously. Consequently, when the scan is performed in an oblique direction, the scan mechanism must be moved alternately in the direction X or Y, thereby presenting the problem that it takes time for the operation of buttons or a lever for scanning.

Furthermore, during frame feeding, when the reproduction of the succeeding frame is performed while holding the scan position and the image magnification of the preceding frame, there is presented the problem that the whole image of the succeeding frame cannot be observed. Further, there is presented the problem that the scan position is manually returned to the center of the film so that the whole frame of the film image can occupy the whole screen of the video monitor from the optional scan position and image magnification, and the image magnification is returned to a standard image magnification to perform the reproduction (hereinafter referred to as a "standard reproduction"), thus taking much time. On the other hand, the scan speed during the operation of the scan buttons and the zoom speed during the operation of the zoom buttons are set at relatively low values, respectively, because it is necessary to determine desired scan position and zooming while observing the image on the screen of the video monitor. For example, there are presented the problems that, to manually return the maximum image magnification to the said standard magnification, it takes about 4 sec., and it takes a long time for the film image to appear in the condition of the standard reproduction.

Further, when a film cartridge having a spool, around which the developed still photo film is wound, is used, if the film cartridge is constructed so as to be put into and taken out through the top portion of the film image input system, then, AV (audio-visual) components and the like cannot be superposed on the top portion of the film image input system, thus unabling to use a space effectively.

Furthermore, it is necessary to guide the developed still photo film in such a manner that the optical axis of the taking lens 6B perpendicularly intersects the surface of the film, in order to form a focal plane over the whole area of the film surface in the pick-up region of the taking lens 6B. Further, it is necessary to make the inclinations of the image sensor 7A and the film coincide with each other in order to prevent the image reproduced on the video monitor from inclining. Namely, it is necessary to adjust three angles for determining relative postures of the taking lens 6B and the film surface.

However, the conventional film image input system is not provided with a mechanism for adjusting these three angles, thus presenting the problems that the focal plane over the whole area of the film surface cannot be formed because of the shift in the relative postures of the taking lens 6B and the film surface due to the errors in the assembling and the like, and the readjusting in forming the focal plane during trimming becomes necessary.

SUMMARY OF THE INVENTION

An object of the present invention is to provide a film image input system wherein the moving speed of a screen on the video monitor during scan can be made constant irrespective of an image magnification, scanning from an optional scan position to an oblique direction can be easily performed, and further, any portion other than the image of the film can be prevented from being monitored during scan.

Another object of the present invention is to provide a film image input system wherein the image magnification can be returned to a standard magnification immediately from optional image magnification and scan position, and the scan position can be returned to the center of a frame for reproduction.

A further object of the present invention is to provide a film image input system wherein a space can be effectively used.

A still further object of the present invention is to provide a film image input system wherein a shift in relative postures of a film surface and a taking lens can be easily adjusted.

To achieve the above-described objects, according to the present invention, a film image input system wherein an image of a developed still photo film is made to focus at an image sensing plane of image pick-up means through a taking lens to be converted into electric signals and the electric signals are input into a video monitor, to thereby reproduce the image on a screen of the video monitor, is characterized in that the said system comprised: a zoom mechanism for changing an image magnification of the taking lens; a scan mechanism for moving an image taking position of the taking lens on the film; and a control means for controlling the scan mechanism in such a manner that the moving speed of the scan mechanism is decreased with the increase in the image magnification of the taking lens and, making the moving speed of the screen on the video monitor constant or easily observed in accordance with the image magnification during scan. Furthermore, the system is provided with control means for expanding a scan scope of the scan mechanism with the increase in the image magnification of the taking lens and shrinking the scan scope of the scan mechanism with the decrease in the image magnification so that any portion other than the film image is not picked up. Furthermore, the system further comprises: scan command means for outputting commands for moving the film image reproduced on the video monitor to four directions including upward, downward, rightward and leftward directions and other four directions including right upward, left downward, left upward and right downward directions, respectively; first and second scan mechanisms for moving the film, the taking lens and the image pick-up means relatively to one another in the vertical and lateral directions; and control means for controlling the first scan mechanism and/or the second scan mechanism in response to a command signal from the scan command means. Furthermore, the control means is characterized in that, when a command signal in the oblique direction is input into the control means from the scan command means, a ratio in speed between the first scan mechanism and the second scan mechanism comes to be proportional to an aspect ratio of the film image. Further, the system further includes: image pick-up means rotating mechanism for rotating the image pick-up means between the lateral position and the longitudinal position thereof; detecting means for detecting the image magnification of the taking lens, the image takings position and the rotating position of the charge coupled device, respectively; and display means for displaying in a manner to be superposed on each other a scope of a frame, which can be picked up when the image pick-up means is in the lateral position or in the longitudinal position, respectively, and a scope of being picked up at present, the both scopes being detected in response to an output from the detecting means.

According to another specific form of the present invention, the film image input system wherein the image of the developed still photo film is made to focus at the image sensing plane of the charge coupled device through the taking lens to be converted into the electric signals and the electric signals are input into the video monitor, to thereby reproduce the image on the screen of the video monitor, is characterized in that the said system comprises: means for commanding the standard reproduction in order to return the scan position to the center of the film so that the whole frame of the film image can occupy the whole screen of the video monitor, and to return the image magnification to a predetermined standard magnification; a detecting means for detecting the image magnification of the taking lens and the taking position, respectively; and control means for controlling the zoom mechanism and the scan mechanism to perform the standard reproduction in response to a detection output from the detecting means, when the standard reproduction is commanded. The system further comprises: zoom command means for outputting a zoom command to zoom the taking lens; a zoom mechanism for zooming the taking lens; a scan command means for outputting a command to move the film image reproduced on the video monitor; a scan mechanism for moving the film, the taking lens and the charge coupled device relatively to one another; standard reproduction command means for outputting a standard reproduction command to return the taking lens to the standard magnification and return the scan position of the frame of the film to the central position of the frame; and control means for controlling the zoom mechanism and the scan mechanism in response to command signals from the zoom command means, the scan command means and the standard reproduction command means, wherein at least one of the zoom speed and the scan speed in the case of being controlled in response to the standard reproduction command means is faster than the zoom speed and the scan speed in the case of being controlled in response to the co,hand signals from the zoom command means and the scan command means.

According to a further specific form of the present invention, the film image input system, wherein the image of the developed still photo film is made to focus at the image sensing plane of the image pick-up means through the taking lens to be converted into the electric signals and the electric signals are input into the video monitor, to thereby reproduce the image on the screen of the video monitor, is characterized in that the system comprises: a cartridge housing part for housing a film cartridge having a spool, around which the developed still photo film is wound, and disposing the film cartridge at a predetermined position in a main body of the film image input system; a lid openably provided on the front surface of the main body, for putting the film cartridge in and taking it out of the cartridge housing part; and a lighting unit provided in the lid, for illuminating the film. Furthermore, the system is provided with a locking means for locking the lid, which is releasable only when the whole film is rolled into the film cartridge.

Furthermore, according to the present invention, in the film image input system comprising: the main body of the film image input system; the lighting unit provided at the side portion in the main body; the taking lens provided in the main body and having an optical axis in parallel to at least the front surface of the main body; a film feeding means for feeding the developed still photo film between the lighting unit and the taking lens; and image sensing means for image-sensing the image on the film to convert it into image signals and outputting the image signals into the video monitor; there is used the film cartridge having the spool, around which the film is wound, the film cartridge can be put into and taken out of the front surface of the main body of the film image input system, and the film in the film cartridge is fed in the direction perpendicularly intersecting the optical axis.

According to a still further specific form of the present invention, the film image input system wherein the developed still photo film is deliverably guided by a film guide member provided between the lighting unit and the taking lens, the image on the film is made to focus at a light receiving plane of the charge coupled device through the taking lens, electric signals photo-electrically transduced in the charge coupled device are output into the video monitor, is characterized in that:

the system comprises a positioning pin implanted on the same base plate as a base plate, on which the taking lens is mounted, and coupled into a positioning hole formed in the bottom portion of the film guide member, three coil springs confined between the film guide member and the base plate, three sets of first adjusting means for fastening the film guide member to be coupled into the positioning pin against the resiliency of the coil springs, and second adjusting means provided between the film guide member and the base plate, for rotating the film guide member about the positioning pin through the adjustment of the thread-in value, three angles for determining the posture of the film guide member is made adjustable by the first and second adjusting means, and a scope of picking up the film and a mode of picking up the film in the lateral and longitudinal directions are displayed on a display device.

According to the present invention, the scan mechanism is controlled in such a manner that the moving speed of the scan mechanism is decreased with the increase in the image magnification. With this arrangement, the moving speed of the screen of the video monitor during scan can be held constant or easily observed in accordance with the image modification irrespective of the image magnification. Furthermore, the scope capable of scanning is restricted in accordance with the magnification, so that the portion other than the film image can be prevented from being monitored during scan. Further, when a command signal of an upward, downward, leftward or rightward direction is given from the scan command means, the first or second scan mechanism is controlled to move the taking position in a frame in the upward, downward, leftward or rightward direction. When a command signal of an oblique direction including a right upward, left upward or right downward direction is given, the first and second scan mechanisms are simultaneously controlled to move the taking position in a frame in the oblique direction. Particularly, when scan is performed in an oblique direction, the speed ratio between the first scan mechanism and the second scan mechanism is controlled to be proportional to an aspect ratio of the film image, so that scan can be performed in a diagonal direction of the film image. Moreover, it is clearly displayed that the scope of pick-up at present corresponds to some portion in the frame, so that it sets up rough standards for the scan operation and the zoom operation.

Furthermore, according to the present invention, when the standard reproduction is commanded, such control is performed that the scan position is returned to the center of the film and the image magnification is returned to a predetermined image magnification so that the film image in the whole frame can occupy the whole screen of the video monitor, from an optional image magnification and scan position. With this arrangement, the standard reproduction can be performed easily, and further, at least one of the zoom speed and the scan speed when the standard reproduction condition is restored is made faster than the zoom speed and the scan speed during manual operation, so that a time period from the operation of the standard reproduction command means to the appearance of the image of the film in the standard reproduction condition can be shortened to a considerable extent.

Further, according to the present invention, the lighting unit is provided in the lid, through which the film cartridge is put in and taken out, so that the film image input system can be rendered compact in size. Furthermore, the lid can be provided on the front surface of the film image input system, so that the film cartridge can be easily put into and taken out of the cartridge housing part.

Moreover, according to the present invention, the three angles for determining the posture of the film guide member to guide the developed still photo film are adjusted, respectively, so that the taking lens and the film surface can be adjusted in their postures relatively to each other. Namely, the fastening value by the three sets of the first adjusting means is adjusted, so that the heights of three points of the film guide member relative to the base plate can be determined. Furthermore, the thread-in value is adjusted by the second adjusting means, so that the film guide member can be suitably rotated about the positioning pin in a plane specified by the determined heights of the three points. Incidentally, one point of the film guide member is positioned as a reference point by one positioning pin, so that not only the posture but also the position of the film can be kept within preset values of error.

BRIEF DESCRIPTION OF THE DRAWINGS

The exact nature of this invention, as well as other objects and advantages thereof, will be readily apparent free consideration of the following specification relating to the accompanying drawings, in which like reference characters designates the same or similar parts throughout the figures thereof and wherein.

DESCRIPTION OF THE PREFERRED EMBODIMENTS

Detailed description will hereunder be given of the preferred embodiments of a film image input system according to the present invention with reference to the accompanying drawings.

(A first embodiment)

Figure 1:
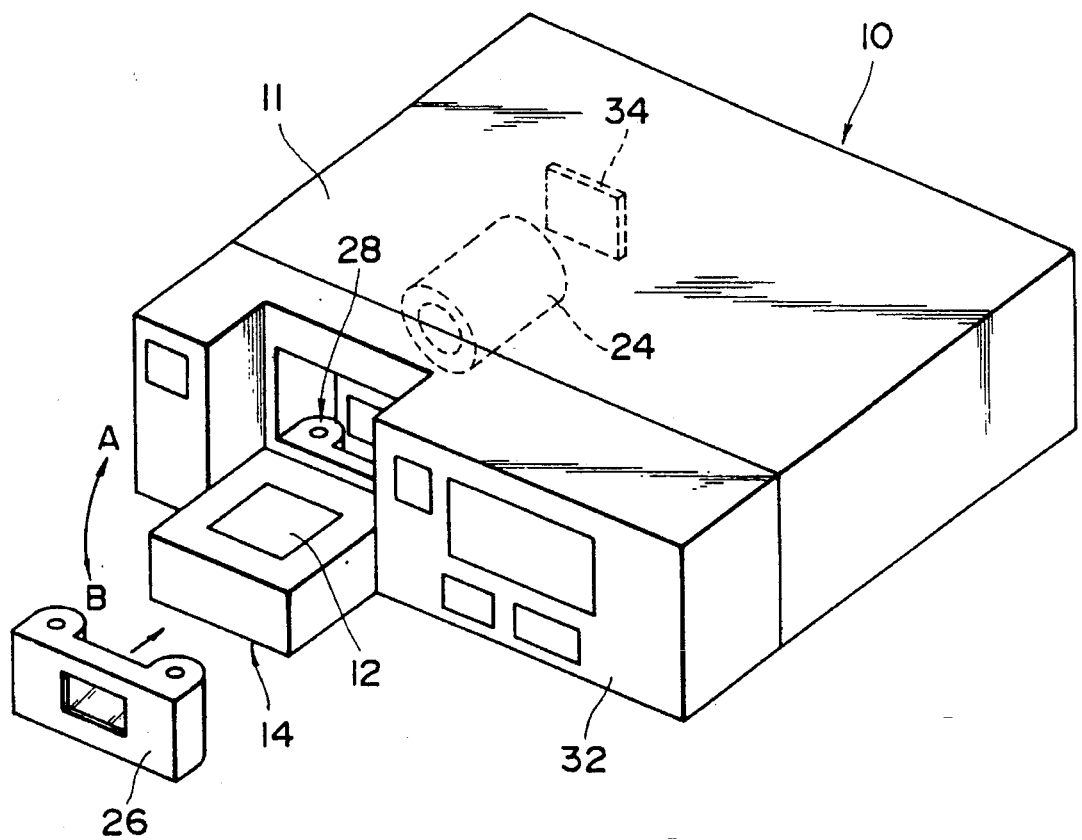
FIG. 1 is a perspective view showing a first example of the outer appearance of the film image input system according to the present invention.
Figure 2:
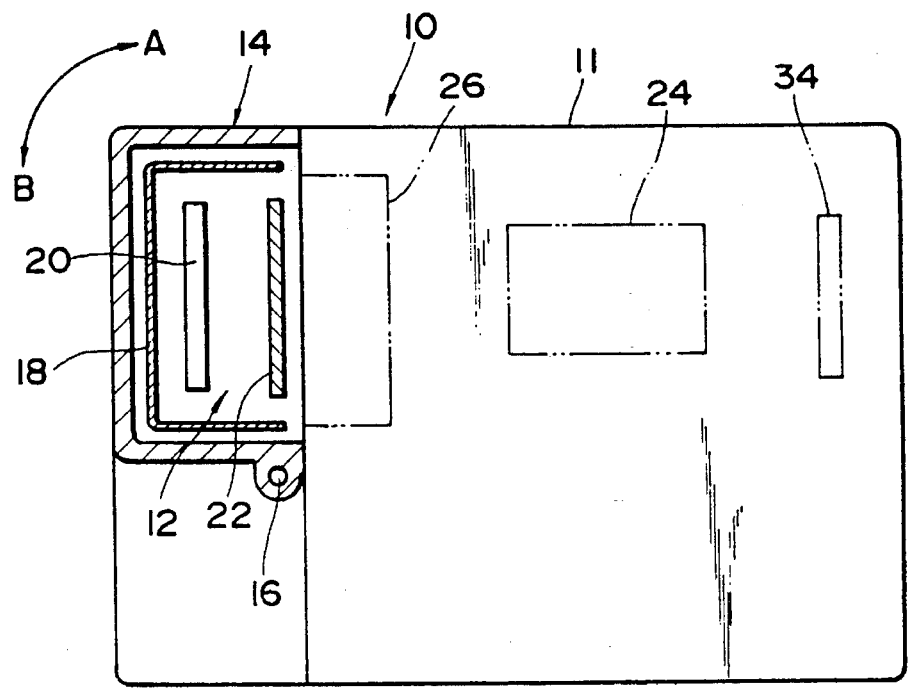
FIG. 2 is a sectional view of the essential portions of FIG. 1.

FIG. 1 is the perspective view showing the first example of the outer appearance of the film image input system according to the present invention. As shown in FIG. 1, a main body 11 of the film image input system 10 is formed to provide a rectangular parallelopiped, at the front portion of which is openably provided a lid 14, in which a lighting unit 12 is disposed. As shown in FIG. 2, the lid 14 is supported rotatably in a direction indicated by arrows A and B on the main body 11 through a pin 16. A reflector plate 18 having a section of a substantially inversed C letter shape is provided on the inner surface of the lid 14, a light source 20 is provided inside the reflector plate 18, and a diffuser plate 22 is provided forwardly of the light source 20. A light thrown forwardly from the light source 20 is diffused by the diffuser plate 22, while, a light thrown rearwardly, namely, in the direction of the reflector plate 18 is reflected by the reflector plate 18 and led to the diffuser plate 22. As described above, the light thrown from the light source 20 is led to a taking lens 24 through the diffuser plate 22.

Furthermore, as shown in FIG. 1, the main body 11 of the film image input system 10 is formed thereon with a cartridge housing part 28 for housing a film cartridge 26. This cartridge housing part 28 is provided on the optical axis of the taking lens 24 and interposed between the taking lens 24 and the lighting unit 12. Accordingly, when the lid 14 is rotated in the closing direction with the film cartridge 26 being housed in the cartridge housing part 28, the film cartridge 26 is disposed on the optical axis of the taking lens and interposed between the lens unit 24 and the lighting unit 12.

Here, the cartridge housing part 28 is not illustrated in detail. However, in the cartridge housing part 28, the well known take-up mechanism engageable with a spool of the film cartridge 26 is provided, so that frame feeding for the film and so forth in the film cartridge 26 can be performed.

Additionally, in FIG. 1, designated at 32 is an operation panel and 34 a charge coupled device (CCD). An image signal output from the CCD 34 through an image signal process circuit, not shown, is applied to a video monitor, not shown, and a film image is reproduced on a screen of the video monitor.

Action of the film image input system with the above-described arrangement according to the present invention will be described.

First, the lid 14 is brought into the opened condition as shown in FIG. 1, and the film cartridge 26 is housed in the cartridge housing part 28. Next, the lid 14 is rotated in the closing direction and the cartridge housing part 28 is closed (Refer to FIG. 2). With this operation, the light source 20, the film cartridge 26, the taking lens 24 and the CCD 34 are arranged on one and the same optical axis, whereby an image recorded on the film of the film cartridge 26 is made to focus at the CCD 34 through the taking lens 24. By this, the film image is converted into electric signals and output.

Figure 3:
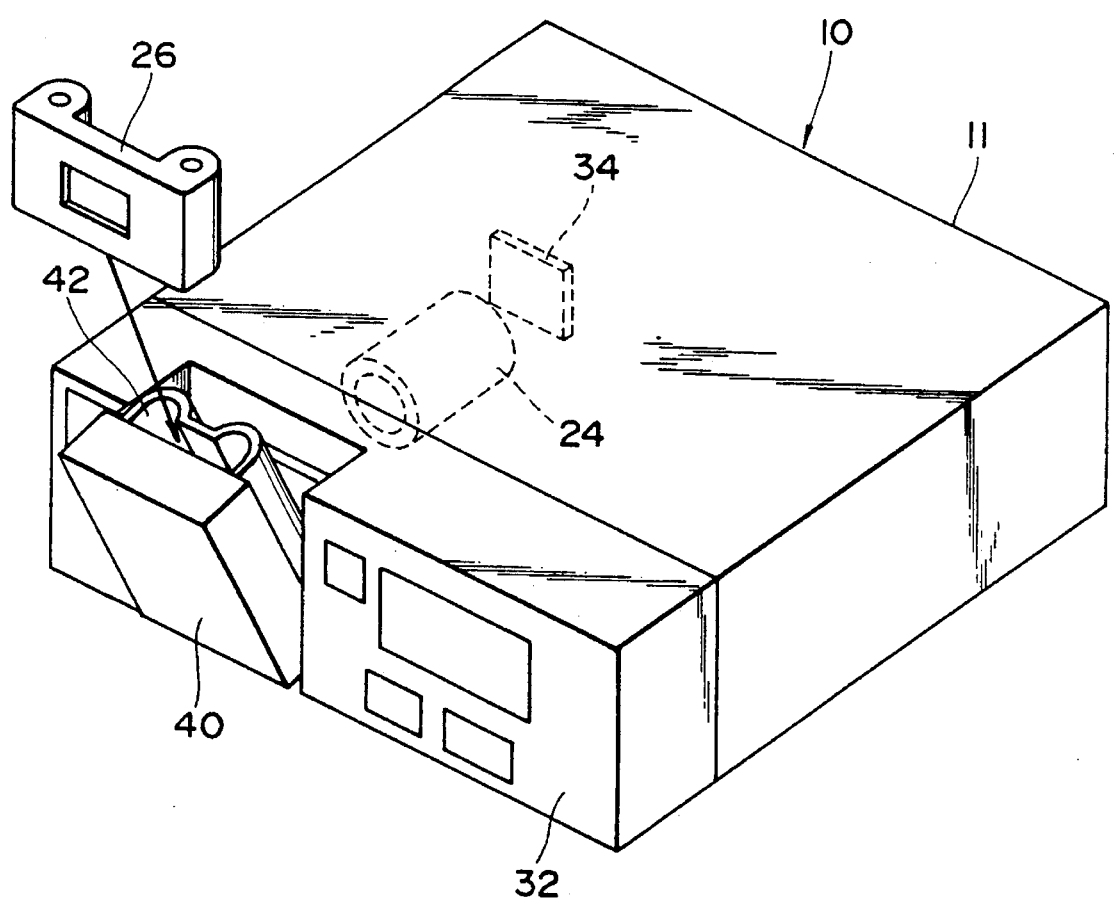
FIG. 3 is a perspective view showing a second example of the outer appearance of the film image input system according to the present invention.

FIG. 3 is the perspective view showing the second example of the outer appearance of the film image input system according to the present invention. In the above embodiment, the film cartridge 26 is directly housed in the cartridge housing part 28 provided on the side of the main body 11, however, the present invention is not limited to this, and a cartridge holder 42 holding the film cartridge 26 may be provided on the rear surface of a lid 40 as shown in FIG. 3.

Incidentally, in the above embodiment, explanation has been given of the case where the film cartridge 26 having two spools is used, however, the present invention is not limited to this, and the present invention is applicable to the film cartridge having one spool. Furthermore, in the above embodiment, the lid is made operable by use of a hinged type one, however, the present invention is not limited to this, and the lid which slides back and forth may be used.

(A second embodiment)

Figure 4:
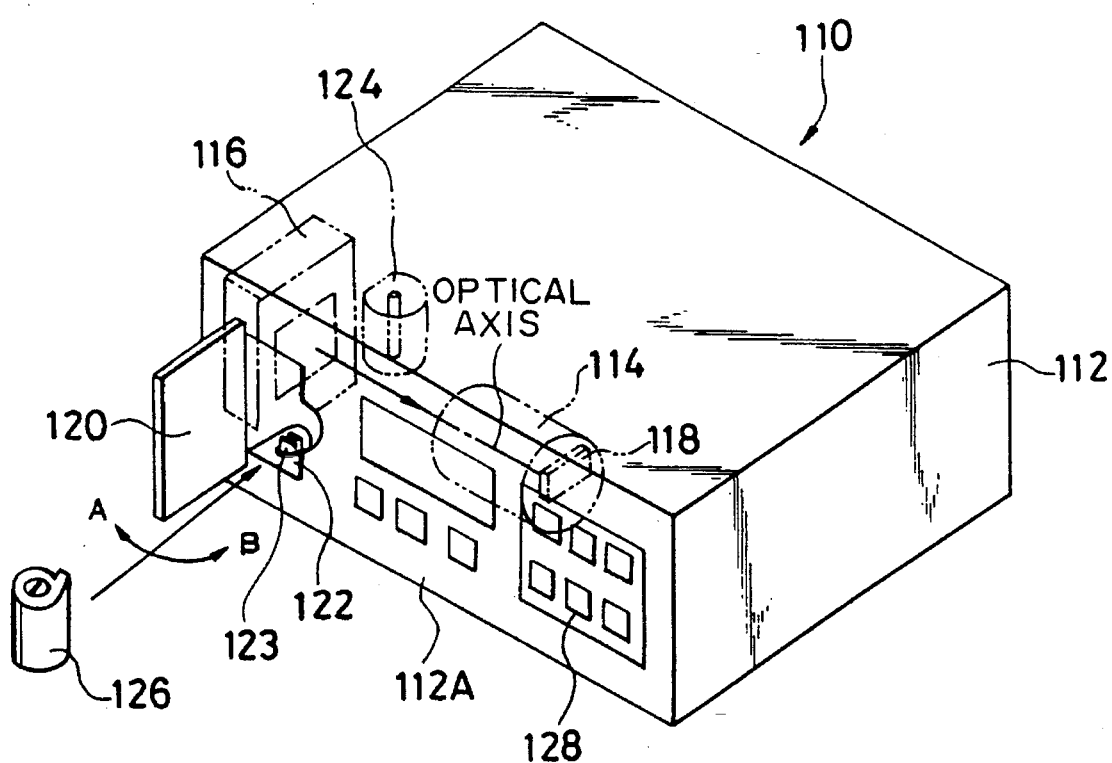
FIG. 4 is a perspective view showing a third example of the outer appearance of the film image input system according to the present invention.

FIG. 4 is the perspective view showing the third example of the outer appearance of the film image input system according to the present invention. As shown in FIG. 4, a main body 112 of a film image input system 110 according to the present invention is formed to provide a rectangular parallelopiped similar to that shown in the first embodiment, and, in this main body 112, a taking lens 114 is provided with the optical axis thereof being in parallel to a front surface 112A of the main body 112. In FIG. 4, a lighting unit 116 is provided on the optical axis of the taking lens 114 on the left side of the taking lens 114, i.e. on the left side of the main body 112. This lighting unit 116 can illuminate a film to be described hereunder, from behind. Furthermore, a taking lens 118 such as a CCD or the like is disposed on the optical axis of the taking lens 114 at the right side of the taking lens 114, i.e. in the rear thereof. Accordingly, the lighting unit 116, the taking lens 114 and the CCD 118 are arranged in a line on the optical axis of the taking lens 114 being in parallel to the front surface 112A of the main body 112.

Furthermore, a lid 120 is openably provided on the front surface 112A of the main body 112, so that a cartridge housing part 122 can be opened or closed by the rotation of the lid 120. The cartridge housing part 122 is provided between the lighting unit 116 and the taking lens 114 and in front of the lighting unit 116 in FIG. 4. Further, the cartridge housing part 122 is provided therein with a film supply mechanism 123, and a film take-up mechanism 124 is provided behind the cartridge housing part 122. With this arrangement, a film cartridge 126 is housed in the cartridge housing part 122. When a film is delivered from the film cartridge 126 by the film supply mechanism 123, the film is taken up by the film take-up mechanism 124. The film thus delivered is illuminated by the lighting unit 116. Incidentally, designated at 128 in FIG. 4 is an operation panel.

Action of the film image input system with the above-described arrangement according to the present invention will be described.

First, as shown in FIG. 4, the lid 120 is opened and the film cartridge 126 is housed in the cartridge housing part 122, and thereafter, the lid 120 is closed. With this operation, the film cartridge 126 is housed in the main body 112 and a spool of the film cartridge 126 is engaged with a supply reel of the film supply mechanism 123. Subsequently, the film in the film cartridge 126 is delivered by the film supply mechanism 123, and thereafter, the forward end of the film is taken up by the film take-up mechanism 124.

Next, when the operation panel 128 is operated, or a remote control, not shown, is operated to command the reproduction of the film image, the lighting unit 116 is lighted up, the light thrown out of this lighting unit 116 passes through the film, falls into the taking lens 114 and is made to focus at the CCD 118. With this operation, the film image is converted into electric signals in the CCD 118 and the electric signals are output into a video monitor through an image signal process circuit, not shown. As described above, according to the present invention, the lighting unit 116 is provided on the side portion of the main body 112 and the taking lens 114 is disposed with the optical axis thereof being in parallel to the front surface 112A of the main body 112, so that the film cartridge 126 can be mounted or detached through the front surface 112A of the main body 112.

Figure 5:
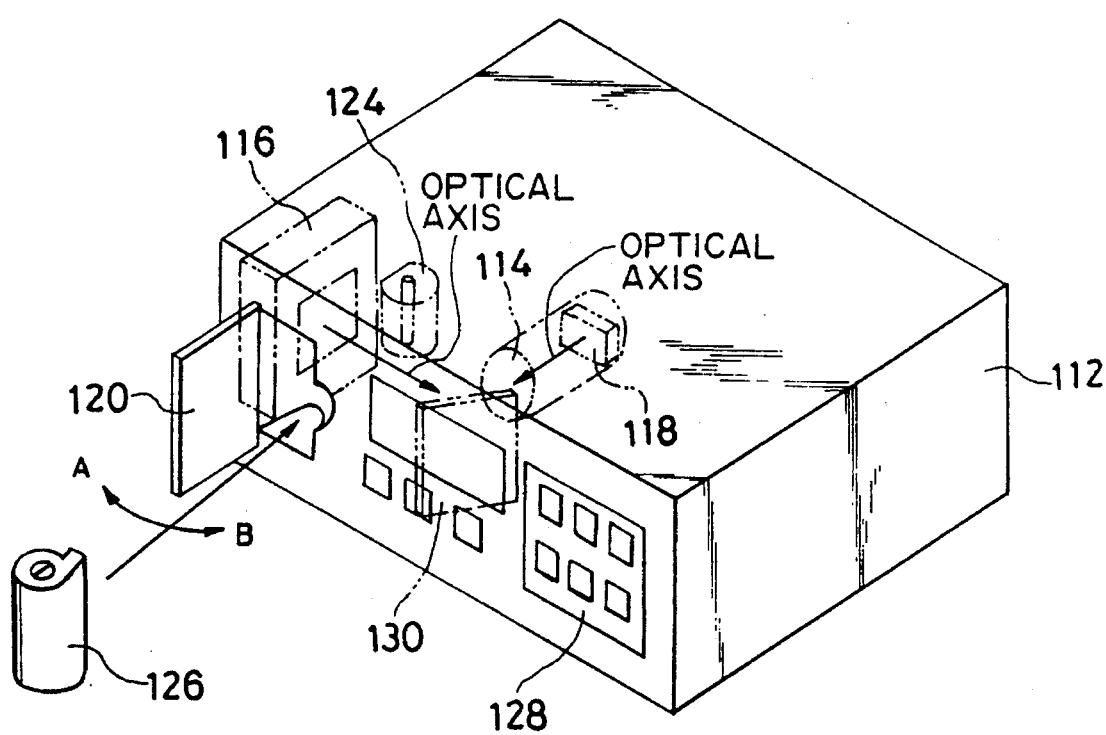
FIG. 5 is a perspective view showing a modified example of the film image input system as shown in FIG. 4.

FIG. 5 is the perspective view showing the modified example of the film image input system shown in FIG. 4. In the above embodiment, the taking lens 114, the lighting unit 116 and the CCD 118 are arranged on the optical axis in parallel to the front surface 112A of the main body 112, however, as shown in FIG. 5, a reflecting mirror 130 may be provided for reflecting a light from the lighting unit 116 at the reflecting mirror 130, to change the direction of the light. With this arrangement, the dispositions of the taking lens 116 and the CCD 118 can be changed, so that the degree of freedom in design can be improved. Incidentally, the portions in FIG. 5, which are common with those in FIG. 4 are denoted by the same reference numerals and the detailed description thereof will be omitted.

Incidentally, in the above embodiment, description has been given of the film cartridge having one spool, however, the present invention is not limited to this, and the present invention may be applied to a film cartridge having two spools. Furthermore, in the above embodiment, the hinged type lid wherein the rotary shaft is disposed in the vertical direction is used, however, the present invention is not limited to this, and a sliding lid slidable back and forth may be adopted or a hinge shaft of the lid may be provided in the lateral direction as shown in FIG. 6.

A locking mechanism of a lid 140 will hereunder be described with reference to FIG. 6.

Figure 6:
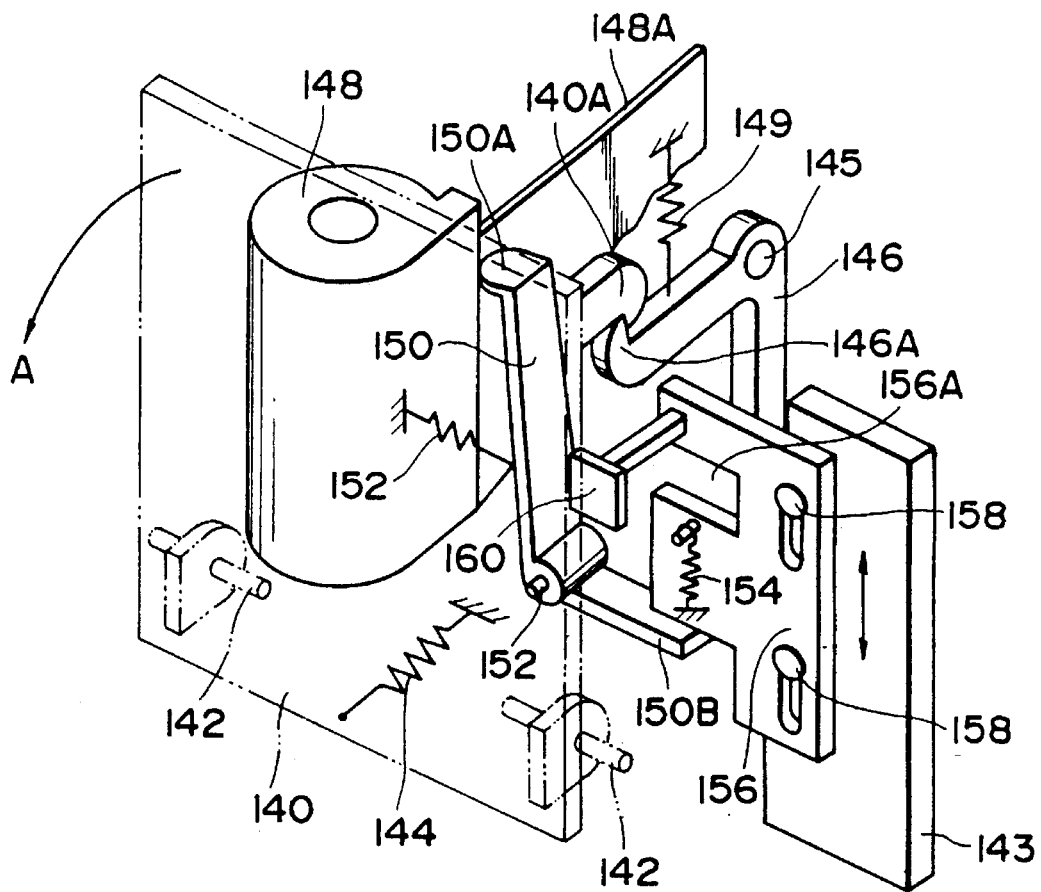
FIG. 6 is a perspective view showing the locking mechanism in the lid of the film image input system according to the present invention.

FIG. 6 is the perspective view showing the locking mechanism in the lid of the film image input system according to the present invention. As shown in FIG. 6, a lid 140 is rotatably supported on a main body 143 of the film image input system through shafts 142, 142, and urged in a counterclockwise direction (a direction indicated by an arrow A in FIG. 6) about the shafts 142 by a spring 144 in FIG. 6. The lid 140 is formed with a lock member 140A which is engaged with a pawl 146A of a lever 146 for locking. This lever 146 is urged in a clockwise direction about a shaft 145 by a spring 149 in the drawing. With this arrangement, the lid 140 is locked in a state of closing a housing opening of a film cartridge 148.

On the other hand, a film sensing lever 150 is rotatably supported on the main body 143 of the film image input system through a shaft 152. Furthermore, the film sensing lever 150 is urged in a counterclockwise direction, i.e. a direction of abutting against a film 148A in the drawing about a shaft 152 through the resiliency of a spring 154. With this arrangement, a probe 150A at a bent portion at the top end of the film sensing lever 150 is in abutting contact with the film 148A delivered from a film cartridge 148.

The top end of a spring 154 is engaged with an ejector preventing plate 156 to urge it downwardly.

The ejector preventing plate 156 is formed therein with slots 156A, 156A for guiding, into which are inserted pins 158, 158 provided on the main body 143 of the film image input system. With this arrangement, the ejector preventing plate 156 cam slide relative to the main body 143 in the vertical direction. Accordingly, for example, when the film 148A is taken up by the film cartridge 148, the probe 150A of the film sensing lever is released from the abutting contact with the film 148A, whereby the film sensing lever 150 is rotated in a counterclockwise direction through the resiliency of the spring 152. Accordingly, the other end 150B of the film sensing lever 150 abuts against the ejector preventing plate 156 to make the ejector preventing plate 156 slide upwardly against the resiliency of the spring 154 (Refer to FIG. 7).

Figure 7:
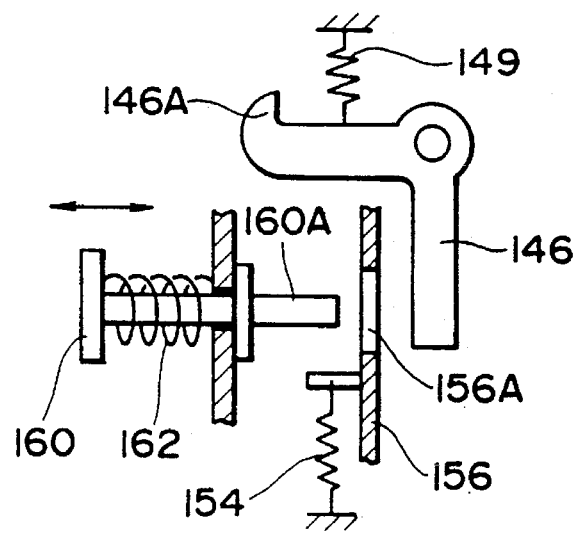
FIG. 7 is an enlarged view of the essential portions shown in FIG. 6.

Further, an ejector knob 160 is provided on the side of the main body 143. As shown in FIG. 7, the ejector knob 160 can be pushed into the main body 143 through a compression spring 162. Accordingly, when the ejector preventing plate 156 has slid upwardly as described above (Refer to FIG. 7), the ejector knob 160 can be pushed in. Then, the ejector knob 160 is pushed in against the resiliency of a spring 162, whereby a pin 160A of the ejector knob 160 is pushed into and passed through a cutaway portion formed in the ejector preventing plate 156 and presses the lever 146. With this operation, the lever 146 is rotated in a counterclockwise direction against the resiliency of the spring 149, whereby the pawl 146A and the lock member 140A are released from engagement, so that the lid 140 is rotated in a direction indicated by an arrow A in FIG. 7 through the resiliency of the spring 144 for opening.

On the other hand, when the probe 150A abuts against the film 148A and the ejector preventing plate 156 is positioned downwardly through the resiliency of the spring 154 (Refer to FIG. 6), even if the ejector knob 160 is pushed in, the pin 160A abuts against the ejector preventing plate 156 and the lid 140 is not opened.

As described above, according to the locking mechanism of the lid 140, unless the film is not completely taken up by the film cartridge 148, the lid 140 will not open.

Figure 8:
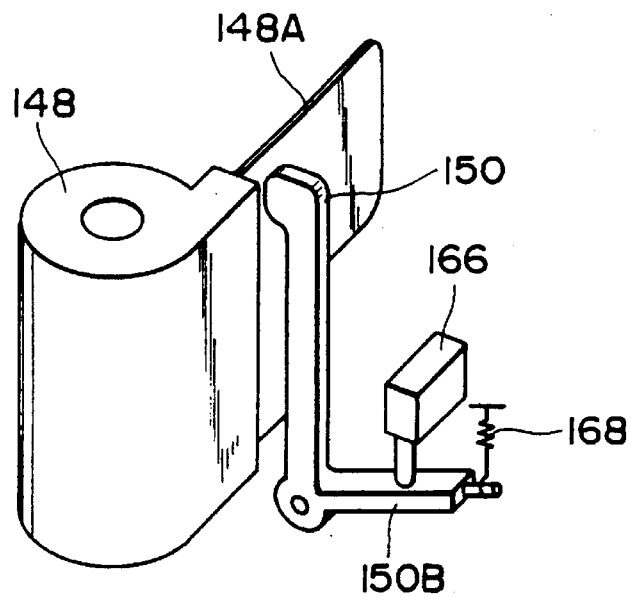
FIG. 8 is a perspective view showing another example of the detector for detecting that the whole film is wound up by the film cartridge.

In the embodiment shown in FIG. 6, the lid 140 is mechanically prevented from opening. However, such arrangement may be adopted that, as shown in FIG. 8, a switch 166 is abutted against the other end 150B of the film sensing lever 150, and, when the film 148A is taken up by the film cartridge 148, the film sensing lever 150 is rotated in a counterclockwise direction through the resiliency of the spring 168 to turn a switch on, and an electric signal thus produced actuates a solenoid, not shown, for example, whereby the lever 146 in FIG. 6 is rotated in a direction of releasing the engagement between the pawl 146A and the lock member 140A. Furthermore, other detecting means such as a photo-interruptor may be used in place of the switch 166.

Figure 9:
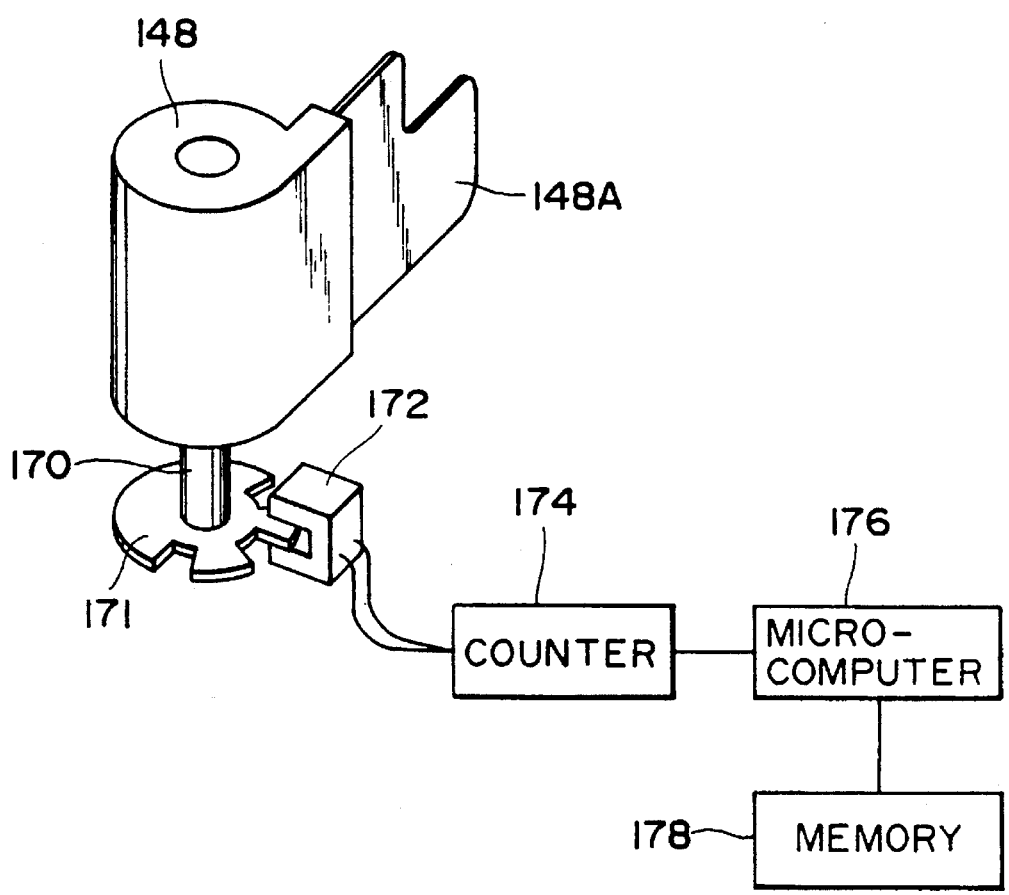
FIG. 9 is a perspective view showing a further example of the detector for detecting that the whole film is wound up by the film cartridge.

Furthermore, in place of the embodiment shown in FIG. 8, such an arrangement may be adopted that, as shown in FIG. 9, the rotary number of a supply shaft 170 of the film cartridge 148 is counted, and, from this counted value, it is detected that whether the film 148A is completely housed in the film cartridge 148 or not. Incidentally, in FIG. 9, designated at 171 is a rotary disc provided at the bottom end portion of the shaft 170, 172 a photo-interruptor for optically detecting the rotation of the rotary disc 171, 174 a counter, 176 a microcomputer and 178 a memory.

(A third embodiment)

Figure 10:
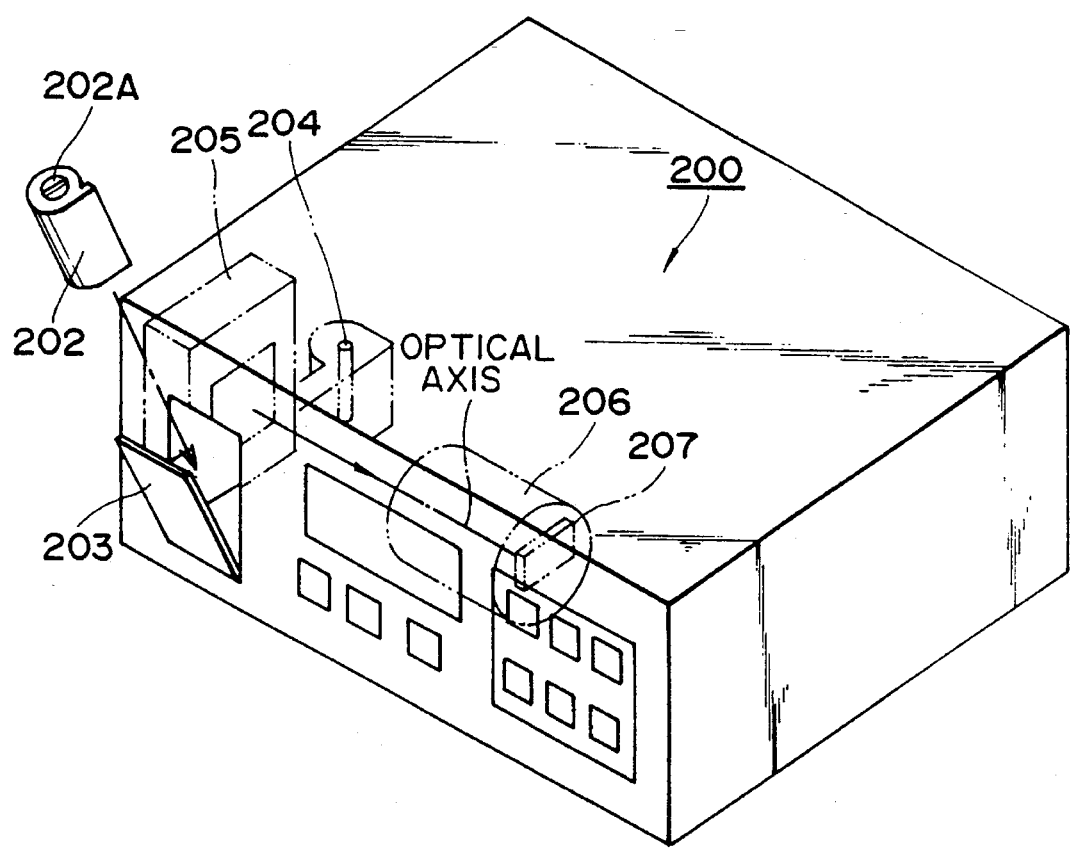
FIG. 10 is a perspective view showing a fourth example of the outer appearance of the film image input system according to the present invention.

FIG. 10 is the perspective view showing the fourth example of the outer appearance of the film image input system according to the present invention. As shown in FIG. 10, a long developed still photo film is housed in a film cartridge 202 having one spool 202A, this film cartridge 202 is housed in a cartridge holder 203 and set in a cartridge mounting part of a film image input system 200 by use of the cartridge holder 203.

A film in the film cartridge 202 set in the cartridge mounting part is fed out of the film cartridge 202, wound around a take-up reel 204, and thereafter, taken up by the take-up reel 204 frame by frame. Each frame of the film thus frame-fed is illuminated by a light unit 205, the film image of the frame thus illuminated is picked up by a taking lens 206 and made to focus at photo cells of the light receiving plane of a CCD 207, where the image is converted into image signals. These image signals are output into a video monitor, not shown, whereby the film image is reproduced.

A film guide mechanism of this film image input system 200 will hereunder be described in detail.

Figure 11:
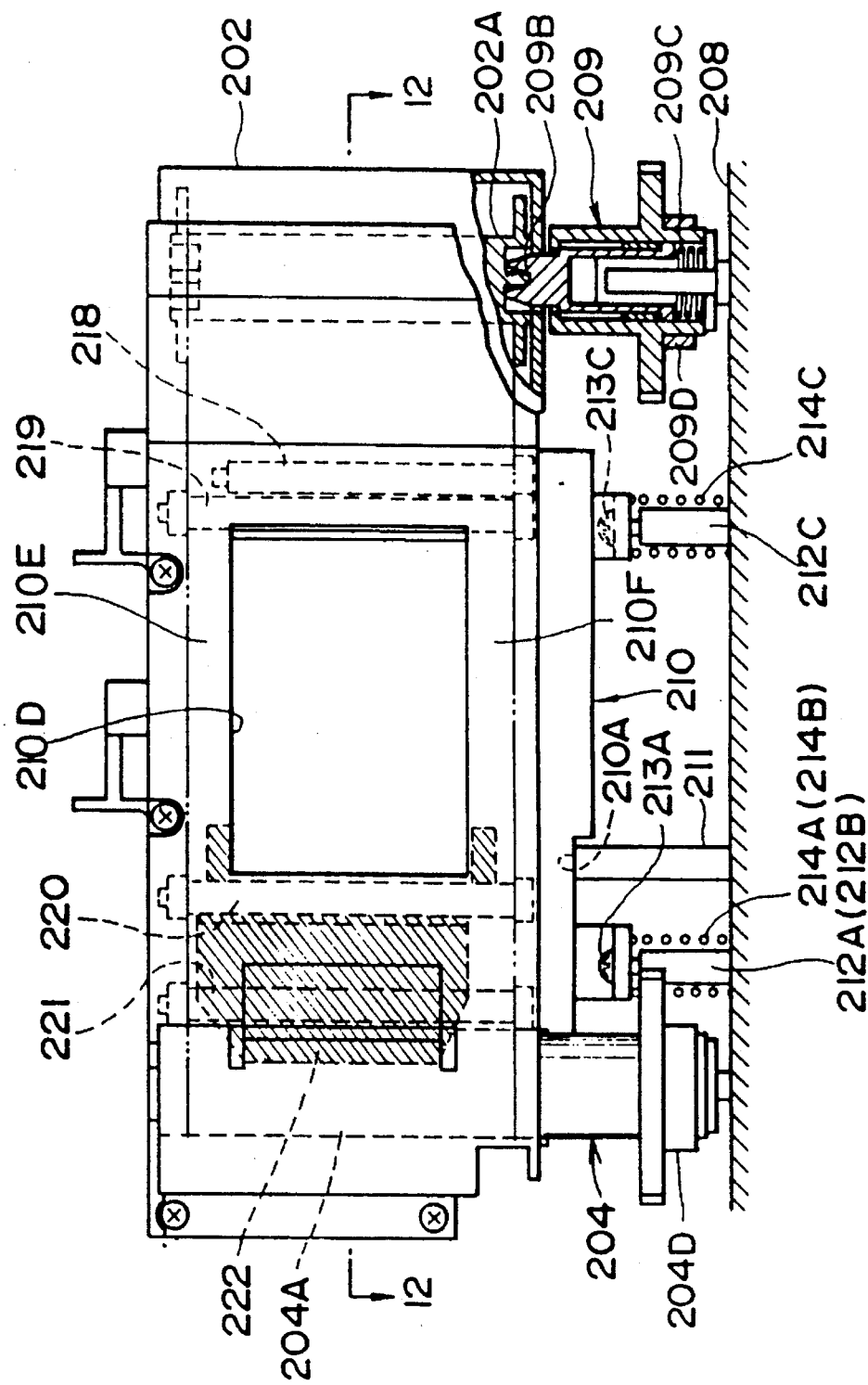
FIG. 11 is a front view mainly showing the film guide mechanism in the film image input system as shown in FIG. 10.
Figure 12:
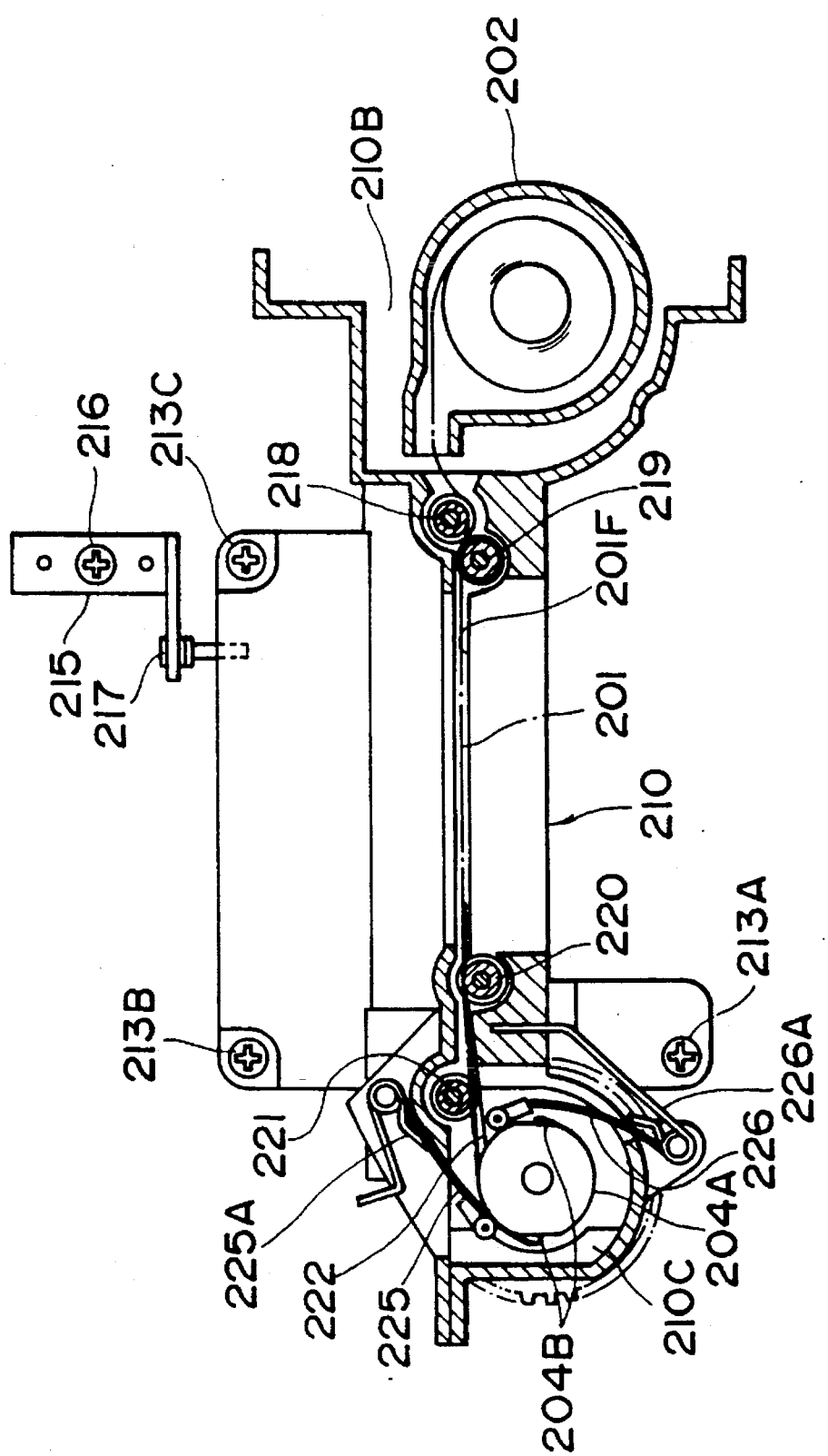
FIG. 12 is a sectional view taken along the line 12—12 in FIG. 11.

FIG. 11 is the front view mainly showing the film guide mechanism as viewed from the side of the lighting unit 205 in FIG. 10. Furthermore, FIG. 12 is the sectional view taken along the line 12—12 in FIG. 11.

As shown in FIG. 11, a supply reel 209 and the take-up reel 204 are rotatably provided on a base plate 208. Furthermore, a positioning pin 211 and three support pins 212A, 212B and 212C each having an internally threaded portion, for mounting a film guide member 210, are implanted on a base plate 208. Additionally, an image-sensing unit, wherein the taking lens 206 and the CCD 207 as shown in FIG. 10 are integrated, is mounted on the base plate 208.

A hole 210A for receiving the positioning pin 211 is formed in the bottom surface of the film guide member 210, and by use of this positioning pin 211, the film guide member 210 can be positioned with a predetermined accuracy, using a point (hole 210A) of the film guide member 210 as a reference point.

The support pins 212A, 212B and 212C are inserted through coil springs 214A, 214B and 214C, respectively, the film guide member 210 is resiliently supported through these coil springs 214A, 214B and 214C, and the height of the film guide member 210 on the support pins 212A, 212B and 212C can be adjusted, respectively, by screws 213A, 213B and 213C (FIG. 12) which are threadably coupled onto the support pins 212A, 212B and 212C. Accordingly, the thread-in values of the screws 213A and 213B are adjusted, whereby the height of the film guide member 210 on the support pins 212A and 212B is adjusted, respectively, so that the film guide member 210 can be adjusted to be erected vertically to the base plate 208. Furthermore, the thread-in values of the screws 213B and 213C are adjusted, whereby the height of the film guide member 210 on the support pins 212B and 212C is adjusted, respectively, so that the film guide member 210 can be adjusted to be in parallel to the base plate 208.

Namely, the thread-in values of the three screws 213A, 213B and 213C are adjusted, so that the film guide member 210 can be adjusted to be in parallel to the base plate 208.

On the other hand, as shown in FIG. 12, an angle 215 is fixed to the base plate 208 through a screw 216, a screw 217 is fixed to one end of this angle 215, and the screw 217 can be threadably coupled to the side portion of the film guide member 210. Rotation of this screw 217 makes it possible to rotate the film guide member 210 adjusted to be in parallel to the base plate 208 about the positioning pin 211 with the film guide member 210 holding the parallel state.

By adjusting the thread-in values of the three screws 213A, 213B, 213C and the screw 217, three angles for determining the posture of the film guide member 210, with which the film surface perpendicularly intersects the optical axis of the taking lens 206 can be adjusted.

Incidentally, the positioning pin 211 is disposed vertically beneath the film 201 guided by the film guide member 210, a film 201 is positioned with a predetermined accuracy not only by its posture but also by the positioning pin 211.

Now, the film guide member 210 is provided with a film housing part 210B housing the film cartridge 202 contained in the cartridge holder 203 and another film housing part 210C, in which a take-up shaft 204A of the take-up reel 204 is disposed, is formed with a window 210D, to which one frame of the film image of a film 201 is exposed, between these film housing parts 210B and 210C, and further, formed with guide grooves 210E and 210F for guiding the top end and the bottom end of the film 201.

Furthermore, guide rollers 218, 219 and guide rollers 220, 221 are respectively provided at an inlet side and an outlet side of the window 210D of the film guide member 210, i.e. at an inlet side and an outlet side of an image-sensing region where image sensing is performed by the taking lens 206.

The pair of guide rollers 218, 219 are provided for guiding the film 201 in a flexed shape of S or Z letter, and similarly, the guide rollers 220, 221 are provided for guiding the film 201 in a flexed shape of S or Z letter. The flatness of the film can be obtained by these guide rollers 218, 219, 220 and 221.

On the other hand, a tongue piece 222 extending from the guide roller 220 to the take-up shaft 204A is provided in this film guide member 210. This guide tongue piece 222 is made of a material (for example, vinyl chloride) softer than the film having the flexibility, and has a shape shown by hatched lines in FIG. 11.

Particularly when the forward end of the film 201 delivered from the film cartridge 202 is automatically wound around the take-up shaft 204A, this guide tongue piece 222 guides the forward end of the film to the take-up side of the take-up shaft 204A (to the left of the take-up shaft 204A in FIG. 12). Namely, the developed film is strongly curls, however, this guide tongue piece 222 prevents the forward end of the film from intruding into the right side of the take-up shaft 204A. Furthermore, when the film 201 is taken up by the take-up shaft 204A and the diameter of widing of the film 201 gradually increases, the guide tongue piece 222 is retracted while abutting against the outer-most circumference of the film.

Incidentally, in FIG. 12, film keepers 225 and 226 are provided around the take-up shaft 204A and the forward ends of these film keepers 225 and 226 can abut against the take-up shaft 204A or the film taken up by the taken-up shaft 204A, respectively, through the resiliency of torsion springs 225A and 226A. Furthermore, pawls 204B engageable with perforations of the film 201 are formed around the take-up shaft 204A. Accordingly, the film 201 is delivered from the film cartridge 202, the forward end thereof is guided by the guide tongue piece 222 and the film keepers 225, 226 and wound around the take-up shaft 204A, and thereafter, when the take-up shaft 204A is rotated in the take-up direction, the pawls 204B of the take-up shaft 204A engage the perforations of the film 201 to take up the film 201.

(A fourth embodiment)

Figure 13:
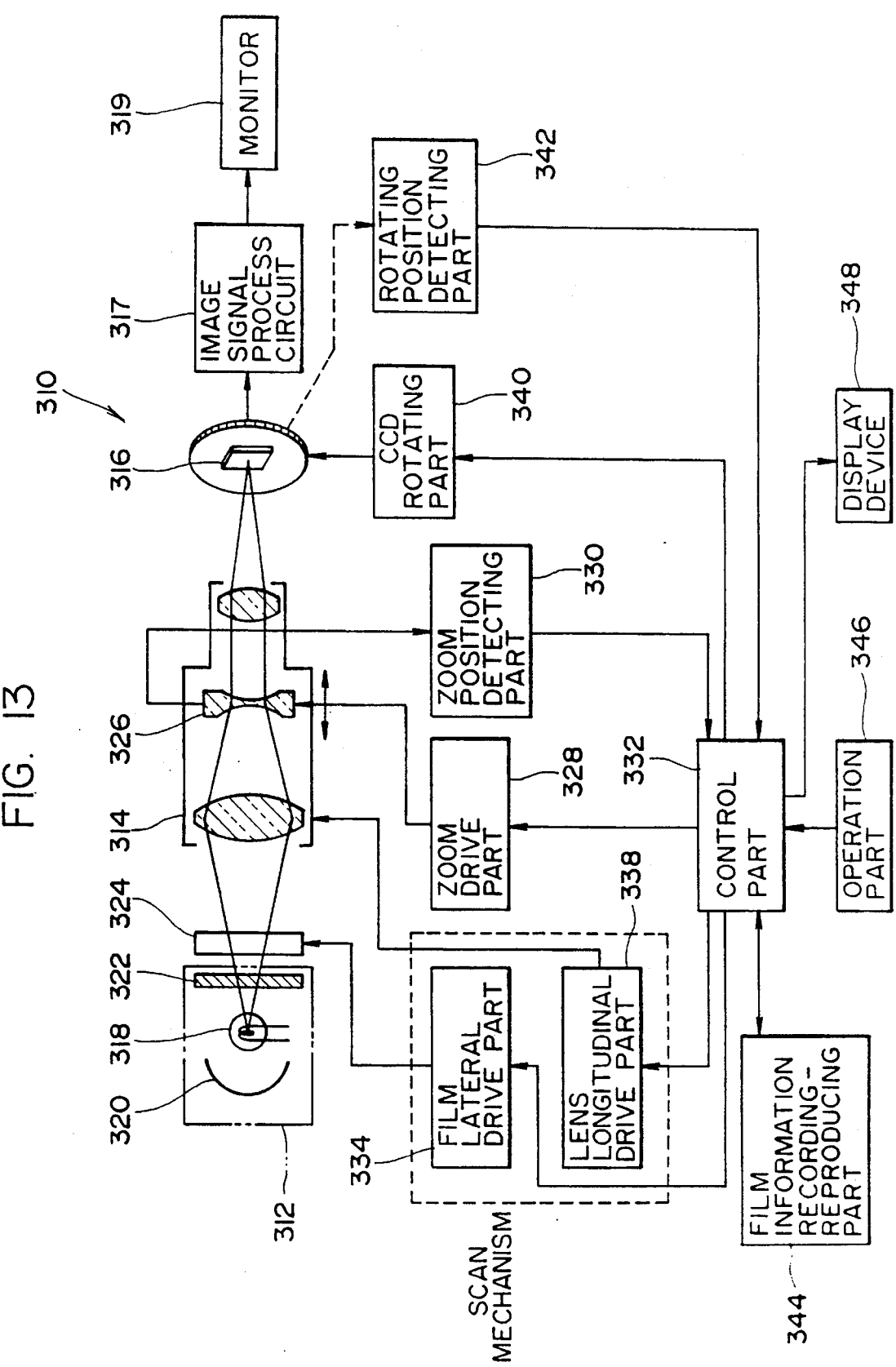
FIG. 13 is a block diagram showing the internal arrangement of the film image input system according to the present invention.

FIG. 13 is the block diagram showing the internal arrangement of the film image input system according to the present invention. As shown in FIG. 13, a film image input system 310 image-senses the developed still photo film with an image-sensing device, outputs image signals to a video monitor 319 and produces the image on the video monitor 319, and comprises a lighting unit 312, an taking lens 314, a charge coupled device (CCD) 316 and an image signal process circuit 317. The lighting unit 312 includes a light source 318, a reflector plate 320 and a diffuser plate 322. The reflector plate 320 effectively reflects a light thrown from the light source 318 to the diffuser plate 322 which can form the thrown light into a diffused light. This diffused light illuminates the image of a film 324 and is led to the taking lens 314.

The taking lens 314 is a zoom lens including a variable power lens 326. In this taking lens, the variable power lens 326 is moved laterally in FIG. 13 by a zoom driving part 328 for receiving a zoom signal from a control part 332, to thereby perform a zoom operation. With this operation, the taking lens 314 can perform zoom-in and zoom-out of the image of the film 324. Furthermore, a zoom position detecting part 330 can detect a moving position (zoom information) of the variable power lens 326 and give the position information to the control part 332.

Furthermore, the film 324 is housed in a film cartridge having one shaft or two shafts, not shown, as in a form of a developed negative or positive film. Winding in or winding out of the film by the film cartridge is performed through the agency of a lateral film driving part 334 for receiving a film feed signal from the control part 332, and the film 324 is moved laterally (in a direction perpendicularly intersecting the paper surface in FIG. 13). On the other hand, the taking lens 314 and the CCD 316 can be moved longitudinally by a longitudinal lens driving part 338 for receiving a scan signal from the control part 332. With this arrangement, the image of the film 324 can be scanned vertically and laterally.

The light of the image picked up by the taking lens 314 is made to focus at a light receiving plane of the CCD 316, and converted into signal loads having the amounts corresponding to the strengths of the light by sensors of the CCD 316. The signal loads are successively read out and input into the image signal process circuit 317. The image signal process circuit 317 includes a sample hold circuit, a white balance circuit, a γ correction circuit, a matrix circuit, an encoder circuit and the like. These circuits perform predetermined signal processes, and thereafter, the image signals are output into the video monitor 319. With this arrangement, the image of the film 324 is displayed on the video monitor 319. Additionally, when the film 324 is a negative film, a signal process for negative/positive conversion is performed in the image signal process circuit 317 as well.

Furthermore, the CCD 316 can be rotated through ±90° by a CCD rotating part 340 for receiving a longitudinal-lateral change-over signal from the control part 332, whereby a rotating position detecting part 342 detects a rotating position of the CCD 316 and delivers the position information to the control part 332. A film information recording/reproducing part 344 records film information (for example, zoom information, scan position information, CCD rotation information and the like) on magnetic record planes for the respective frames of the film 324 and the like in response to signals from the control part 332, reads out the film information from the film 324 and outputs it to the control part 332. Additionally, the film 324 is provided with notches each previously showing a position of frame for each frame. A frame detecting means, not shown, for detecting the notch can detect that each frame has been frame-fed to a predetermined taking position.

This control part 332 outputs various control signals to a zoom driving part 328, the CCD rotating part 340, the lateral film driving part 334 and the longitudinal lens driving part 338 in response to signals from the zoom position detecting part 330, a rotating position detecting part 342, the film information recording/reproducing part 344 and an operation part 346 to be described hereunder, and, when necessary, outputs the film information to the film information recording/reproducing part 344, where the film information is recorded on the film 324.

Figure 14:
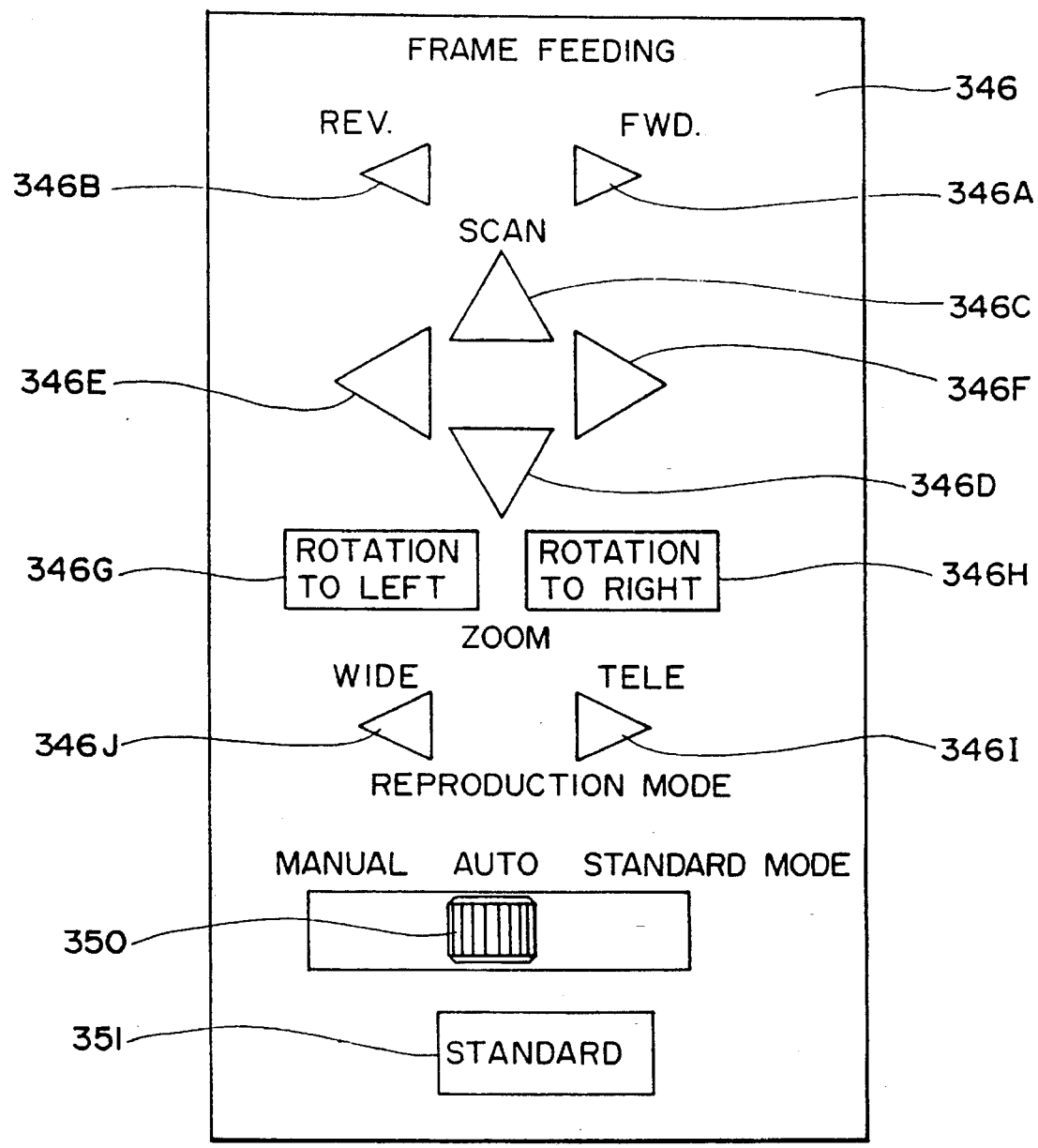
FIG. 14 is an enlarged plan view showing an embodiment of the operation part in FIG. 13.

FIG. 14 is the plan view showing the embodiment of the operation part 346 in detail as shown in FIG. 13. As shown in FIG. 14, the operation part 346 is provided with frame feed buttons 346A and 346B for commanding the frame feeding of the film 324, scan buttons 346C, 346D, 346E and 346F for commanding the scan of a picture within a frame, rotation command buttons 346G and 346H for commanding the rotation of the CCD 316, and zoom buttons 346I and 346J for commanding the zoom-in and zoom-out of the film image. Further, the operation part 346 is provided with an auto button 350 and a standard button 351. The auto button 350 can select any one of modes of three types including a manual mode, an auto mode and a standard mode.

Here, the manual mode refers to a mode reproduced with the scan position operated by the scan buttons 346C, 346D, 346E and 346F and the zoom position operated by the zoom buttons 346I and 346J being held as they are when the film 324 is frame-fed anew, and the auto mode refers to a mode reproduced in accordance with the film information such as the image magnification and the scan position as recorded in the film 324. Further, the standard mode refers to a mode reproduced when the scan position is returned to the center of the film and the image magnification is returned to the standard magnification (standard reproduction).

Figure 15A:
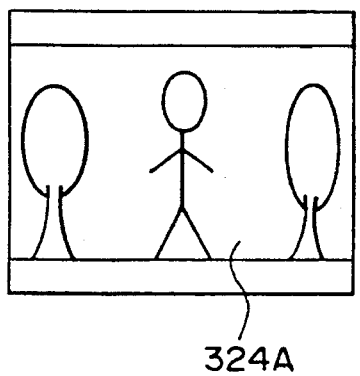
FIGS. 15(A) and 15(B) are plan views of display pictures for explaining the lateral standard reproduction, respectively.
Figure 15B:
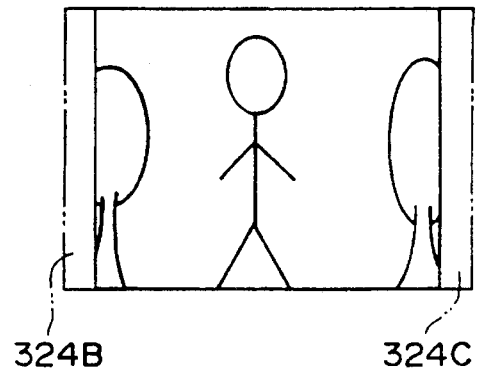

Incidentally, the standard reproduction includes a lateral standard reproduction and a longitudinal standard reproduction. The former and the latter are different in standard magnification and rotating position of the CCD 316 during reproduction from each other. Namely, the standard magnification includes a lateral standard modification corresponding to the case where a picture picked up in a frame of the film 324 is laterally long and a longitudinal standard modification corresponding to the case where a picture picked up in a frame is longitudinally long. Furthermore, the lateral standard modification includes magnifications of two types. Namely, one of the modifications regarded as the first one of the lateral standard modification refers to a modification wherein right and left edges of a frame 324A of the film 324 coincide with right and left edges of a screen of the video monitor as shown in FIG. 15(A). In this case, since the film (aspect ratio 2:3) and the screen of the monitor (aspect ratio 3:4) are different in aspect ratio from each other, blank portions are formed in the top end and the bottom end of the screen of the monitor. Furthermore, the other of the modifications regarded as the second one of the lateral standard modification refers to a modification wherein top and bottom edges of the frame of the film 324 coincide with top and bottom edges of the screen of the monitor as shown in FIG.15(B). In this case, portions 324B and 324C at opposite sides of the image of the film are blank and not monitored.

Figure 16A:
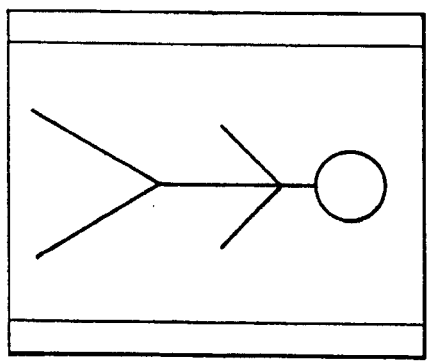
FIGS. 16(A) and 16(B) are plan views of display pictures for explaining the longitudinal standard reproduction.
Figure 16B:
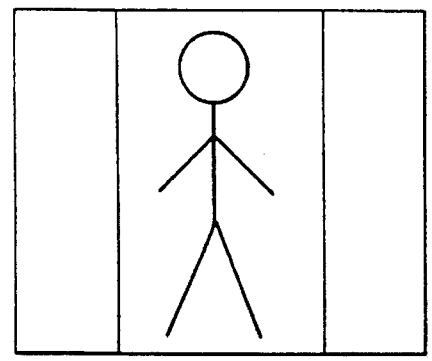

On the other hand, the longitudinal standard modification is such a modification that, when the CCD 316 is rotated through 90° to make the picture picked up in a longitudinally long shape in the frame correctly erected as will be described hereunder, the top and bottom edges of the picture coincide with the top and bottom edges of the screen of the monitor. Namely, when a picture picked up in a longitudinally long shape in the frame is brought into the lateral standard reproduction, the picture is displayed as in FIG. 16(A). When the CCD 316 is rotated through 90° in the above state and the taking lens 314 is turned to have the longitudinal standard magnification, the longitudinal standard reproduction as shown in FIG. 16(B) is brought about.

Figure 17:
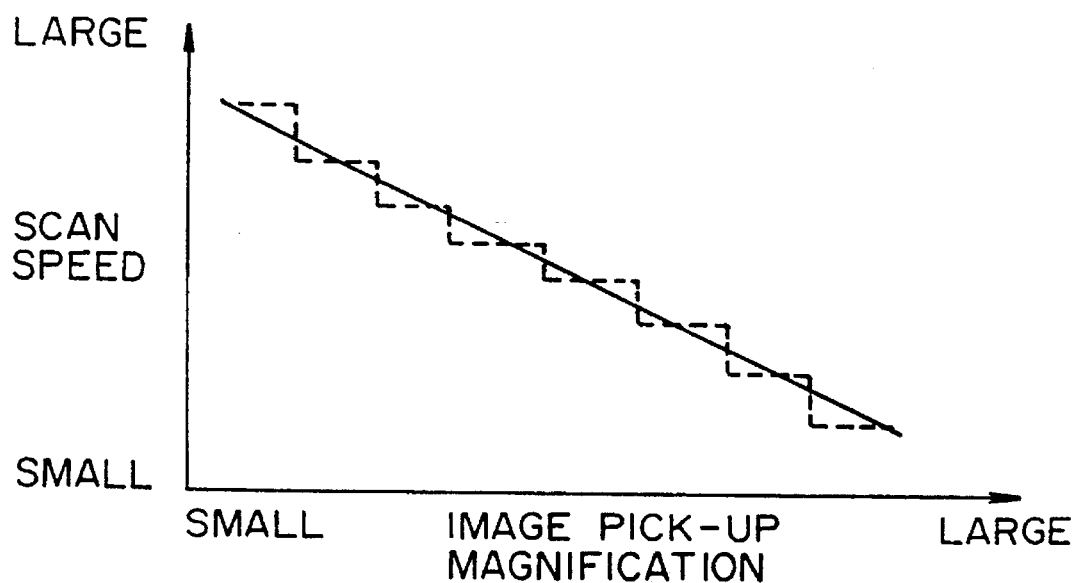
FIG. 17 is a graphic chart showing a relationship between the scan speed and the focal length of the zoom lens.

Furthermore, upon receiving the scan signals from the scan buttons 346C, 346D, 346E and 346F, the control part 332 outputs control signals to the lateral film driving part 334 and the longitudinal lens driving part 338 in such a manner that feed speeds of the film 324 supplied by the lateral film driving part 334 and feed speeds of the taking lens 314 supplied by the longitudinal lens driving part 338 (hereinafter, these feed speeds are referred to as "scan speeds") are changed on the basis of the zoom position information of the taking lens 314 output from the zoom position detecting part 330. Namely, as shown in FIG. 17, the control part 332 outputs control signals to the lateral film driving part 334 and the longitudinal lens driving part 338 so as to decrease the scan speeds with the increase in the image magnification (focal length) of the taking lens 314, whereby the moving speed of the screen of the video monitor 319 is held constant irrespective of the image magnification of the taking lens 314.

Incidentally, in the above embodiment, the moving speed of the screen of the video monitor 319 is held constant during scan, however, the present invention is not limited to this and the moving speed may be controlled to a speed easily observed in accordance with the image modification. Namely, control is made in such a manner that the scan speed is decreased with the increase of the image magnification and the moving speed of the screen when the image magnification is small is somewhat slower than the moving speed of the screen when the image magnification is large.

The reason resides in that, if the moving speed of the screen is constant, then the picture having small details when the image magnification is small is sensibly felt fast as compared with the picture having rough details when the image magnification is large. Furthermore, in FIG. 17, a solid line shows the case where the scan speed is continuously changed relative to the image magnification and a dotted line shows the case where the scan speed is gradually changed in a stair-step relative to the image magnification.

Action of the film image input system with the above-described arrangement according to the present invention will hereunder be described.

First, the film cartridge having the film 324 is set in the film image input system 310. With this arrangement, the control part 332 controls the lateral film driving part 334 so as to position the first frame between the lighting unit 312 and the taking lens 314. This frame is illuminated by the lighting unit 312 and put in the screen of the video monitor 319 through the taking lens 314, the CCD 316 and the image signal process circuit 317.

When the film image displayed in this state is to be zoomed, the zoom buttons 346I and 346J of the operation part 346 are operated to give zoom signals to the control part 332. The control part 332 controls the zoom driving part 328 in response to the above-mentioned zoom signals so that the variable power lens 326 of the taking lens 314 is moved.

On the other hand, when the displayed film image is to be scanned, the scan buttons 346C, 346D, 346E and 346F of the operation part 346 are operated to output the scan signals to the control part 332. The control part 332 receives the zoom position information from the zoom position detecting part 330, and controls the lateral film driving part 334 and the longitudinal lens driving part 338 in response to the scan signals and the zoom position information. Namely, the control part 332 moves the film 324 or the taking lens 314 in the scan direction corresponding to the scan signals, and controls the scan speeds on the basis of the above-mentioned zoom position information (image magnification) as shown in a graphic chart in FIG. 17.

Incidentally, the zoom position information, the scan position information, the CCD rotation information and the like, when necessary, may be recorded in a magnetic recording layer of the frame from the control part 332 through the film information recording/reproducing part 344 at the time of the frame feeding.

Figure 18:
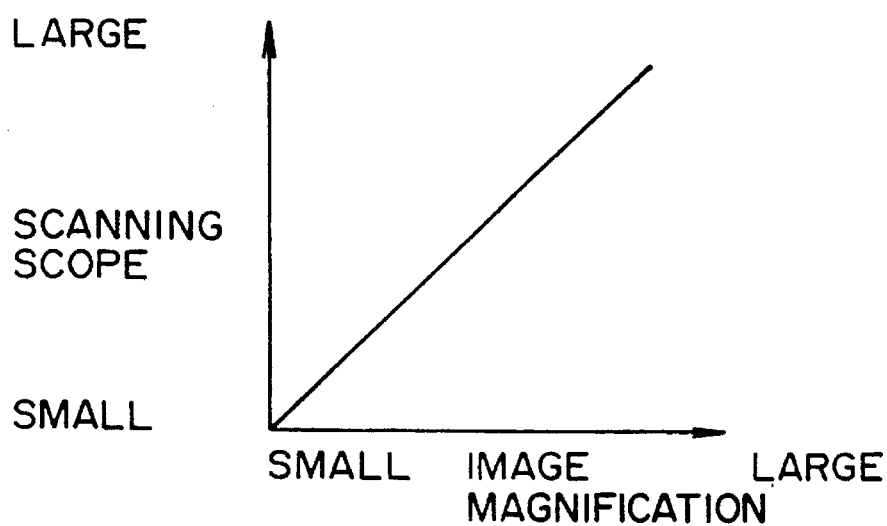
FIG. 18 is a graphic chart showing a relationship between the scan scope and the focal length of the zoom lens.

In the above embodiment, the scan speeds are changed in accordance with the zoom position information of the taking lens 314 and the moving speed of the screen of the video monitor 314 at the time of scan is made constant. However, further, the control part 332 can specify the scan scopes of the lateral film driving part 334 and the longitudinal lens driving part 338 on the basis of the zoom position information of the taking lens 314. Namely, as shown in FIG. 18, the control part 332 increases the scan scopes, within which the lateral film driving part 334 and the longitudinal lens driving part 338 are movable, with the increase in the image magnification of the taking lens 314, and decreases the scan scopes, within which the lateral film driving part 334 and the longitudinal lens driving part 338 are movable, with the decrease in the image magnification of the taking lens 314. Control of the scan scopes as described above makes it possible not to monitor portions other than the film image at the time of scan.

Furthermore, as shown in FIG. 13, the film image input system 310 is provided with a display device 348. The zoom position information and the scan position information are given to the display device 348 from the control part 332, and the display device 348 displays the above-mentioned information on a screen thereof.

Figure 19:
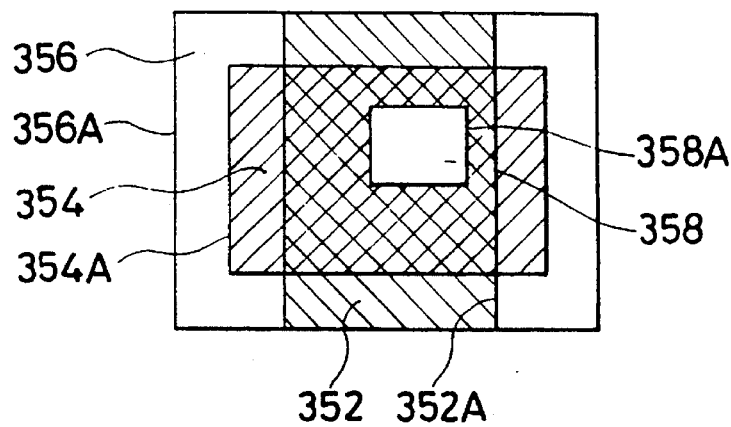
FIG. 19 is a plan view explaining the display device in FIG. 13.

As shown in FIG. 19, the information displayed on the screen of the display device 348 includes: a subject area 356 defined by a line 356A; border lines 352A and 354A showing film image areas 352 and 354 showing the whole areas of the film image in the longitudinal and lateral standard reproduction conditions, respectively; and an observation area 358 within a line 358A made to focus at the CCD 316 through the taking lens 314 (i.e. a film image being observed by the video monitor 319 at present). Incidentally, the subject area 356, for example, is formed such that the whole area of the film image in the longitudinal standard reproduction condition occupies the whole area thereof and the aspect ratio of the area 356 is 4:3 similarly to the aspect ratio of the video monitor 319. However, one larger than this may be adopted.

Figure 20A:
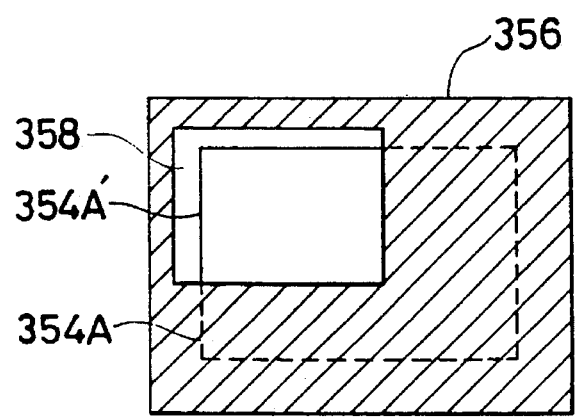
FIGS. 20(A) and 20(B) are plan views showing the content of display of the display device in FIG. 13.
Figure 20B:
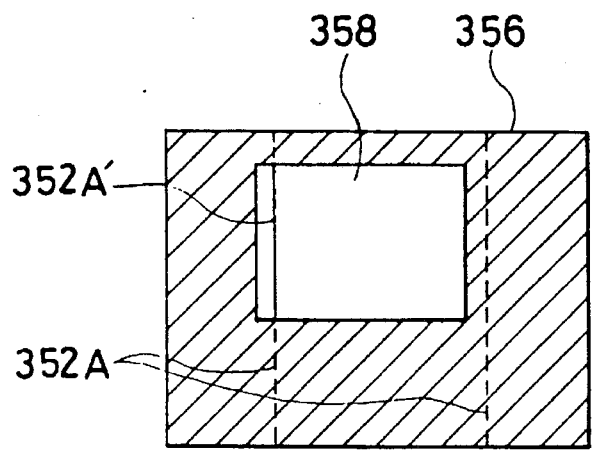

As shown in FIGS. 20(A) and 20(B), when the film picked up with a camera being held horizontally is put in the screen of the video monitor 319, the border line 354A of the film image area 354 showing the lateral standard reproduction condition is displayed (Refer to FIG. 20A), and when the film picked up with the camera being held longitudinally is put in the screen of the video monitor 319, the border line 352A of the film image area 352 showing the longitudinal standard reproduction condition is displayed (Refer to FIG. 20(B)).

With this arrangement, if the screen of the display device 348 is watched, it is immediately known whether the film image is a longitudinal image or a lateral image, and, at a glance, it is known what portion of a frame is scanned or to what degree the image is zoomed.

Incidentally, as to which of the border line 352A or 354A is chosen, automatic selection can be performed on the basis of the CCD rotation information and the like. Furthermore, the border line 354A is displayed by a dotted line, however, a border line 352A' superposed on the observation area 358 is displayed by a solid line. Furthermore, the subject area 356 other than the observation area 358 and the observation area 358 are displayed by colors different from each other, or colors dark or light so that they can be discriminated on the screen.

Further detailed operations of the film image input system by the button operations of the operation part 346 will hereunder be described.

Figure 21:
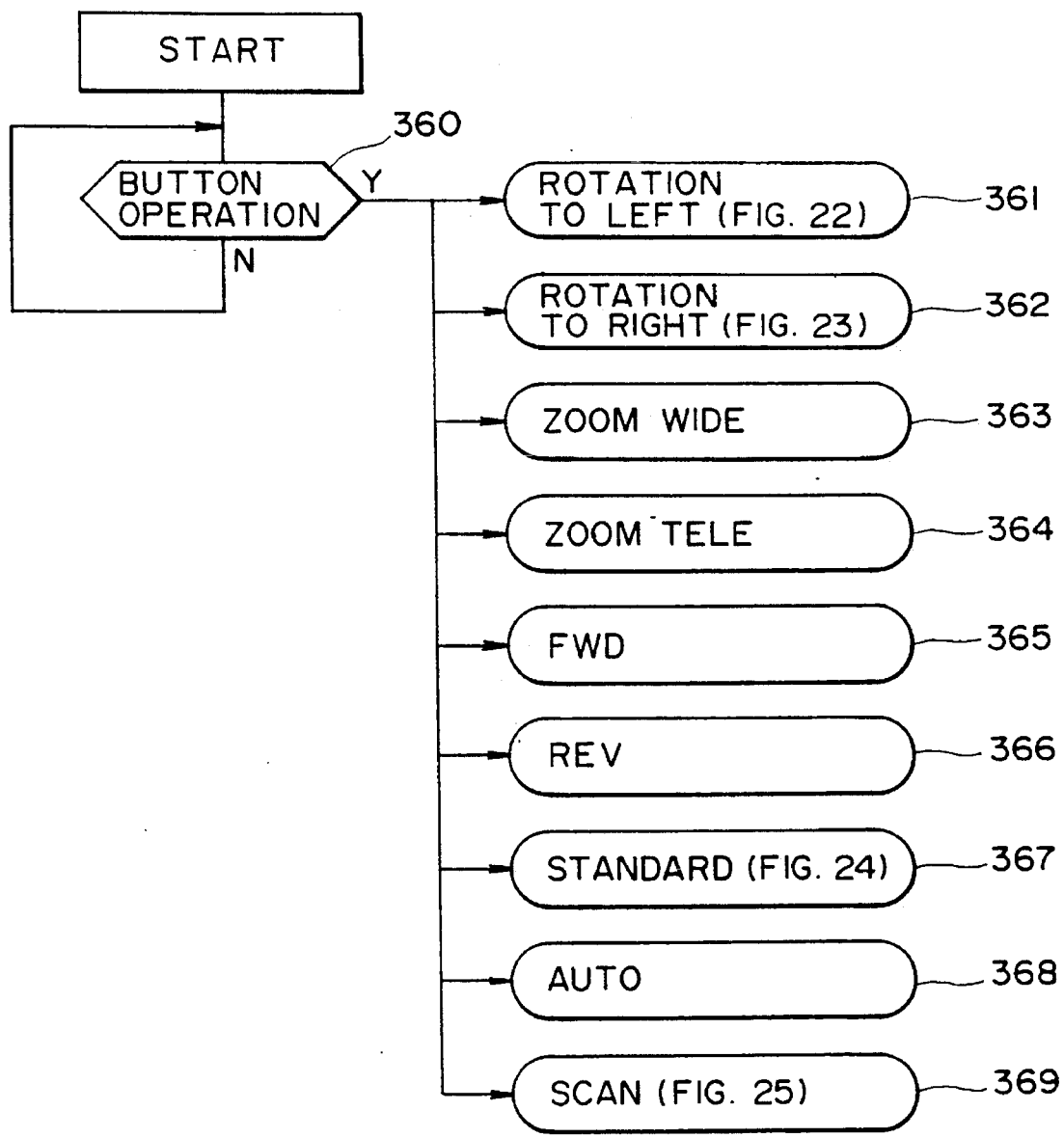
FIG. 21 is a flow chart showing the operations corresponding to various button operations in the operation part.

As shown in FIG. 21, the control part 332 discriminates as to what button of the operation part 346 is operated (Step 360), and, if a button is operated, performs the control according to the type of the operated button. Namely, when the rotation command buttons 346G, 346H, the zoom buttons 346I, 346J, the frame feeding buttons 346A, 346B, the standard button 351, the auto button 350, or the scan buttons 346C, 346D, 346E and 346F are operated, respectively, the control part 332 performs a leftward rotation control 361 for rotating to left a picture on the screen of the video monitor 319, a rightward rotation control 362 for rotating to right the picture on the screen of the video monitor 319, a control 363 for zooming the taking lens 314 in a wide direction, a control 364 for zooming the taking lens in a tele direction, a control 365 for feeding the frame in the forward direction, a control 366 for feeding the frame in the reverse direction, a standard reproduction control 367 for reproducing the film image in the standard condition, a control 368 for reproducing the film image in accordance with the film information recorded in the film 324 or a scan control 369 for moving the image taking position in a frame, respectively.

The leftward rotation control 361, the rightward rotation control 362, the standard reproduction control 367 and the scan control 369 will hereunder be described (CCD rotation).

Figure 22:
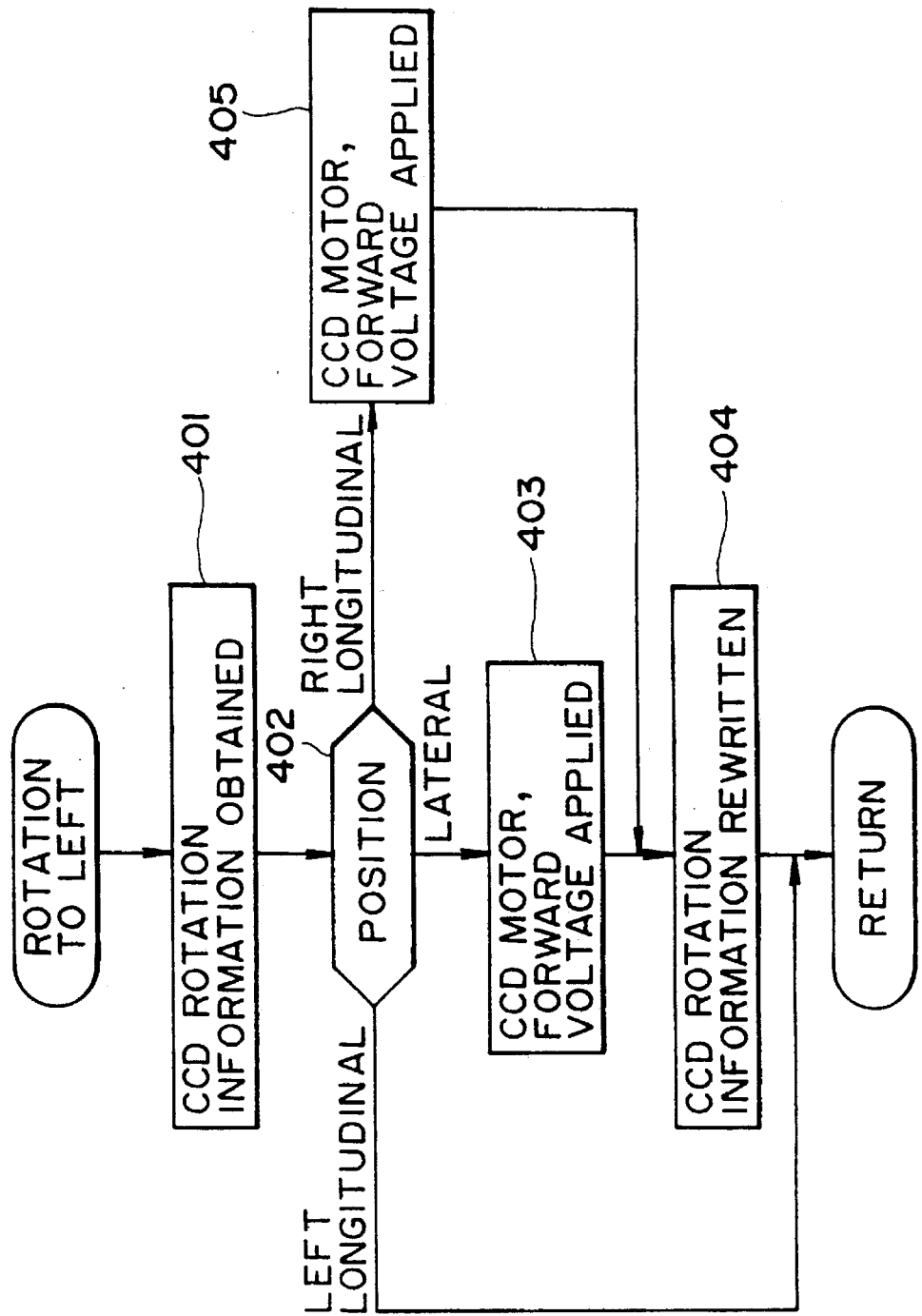
FIG. 22 is a flow chart showing the leftward rotation control performed when a rotation command button of the operation part is operated.

FIG. 22 is the flow chart showing the leftward rotation control performed when the rotation command button 346G is operated.

As shown in FIG. 22, first, the rotating position information of the CCD 316 is taken in from the rotating position detecting part 342 (Step 401). This rotating position information includes a right longitudinal position, a lateral position and a left longitudinal position. Here, the lateral position refers to a rotating position of the CCD 316, at which a picture picked up in a laterally long shape in a frame of the film 324 is reproduced while being correctly erected in the screen of the video monitor. Furthermore, the right longitudinal position refers to a position to which the CCD 316 is rotated 90° in a counterclockwise direction (CCW direction) in reference to the lateral position as viewed from backside. By rotating the CCD 316 in this way, the picture on the screen of the video monitor can be rotated through 90° to the right. Furthermore, the left longitudinal position refers to a position to which the CCD 316 is rotated 90° in a clockwise direction (CW direction) in reference to the lateral position as viewed from backside. By rotating the CCD 316 in this way, the picture on the screen of the video monitor can be rotated through 90° to the left.

Now, when the rotating position information of the CCD 316 is judged to be the lateral position in Step 402, a forward voltage is applied to a CCD motor to rotate the CCD 316 through 90° in the CW direction (Step 403). With this operation, the picture on the screen of the video monitor is rotated through 90° to the left. Then, the CCD rotating information is rewritten to the left longitudinal position (Step 404), and thereafter, the process returns to a start shown in FIG. 21.

Furthermore, when the rotating position information of the CCD 316 is judged to be the right longitudinal position in Step 402, similarly to Step 403, the forward voltage is applied to the CCD motor to rotate the CCD 316 through 90° in the CW direction (Step 405). Then, the rotating position information of the CCD 316 is rewritten to the lateral position (Step 404), and thereafter, the process returns to the start shown in FIG. 21.

On the other hand, when the rotating position information of the CCD 316 is judged to be the left longitudinal position in Step 402, the CCD 316 cannot be rotated in the CW direction. In this case, the process immediately returns to the start shown in FIG. 21.

Figure 23:
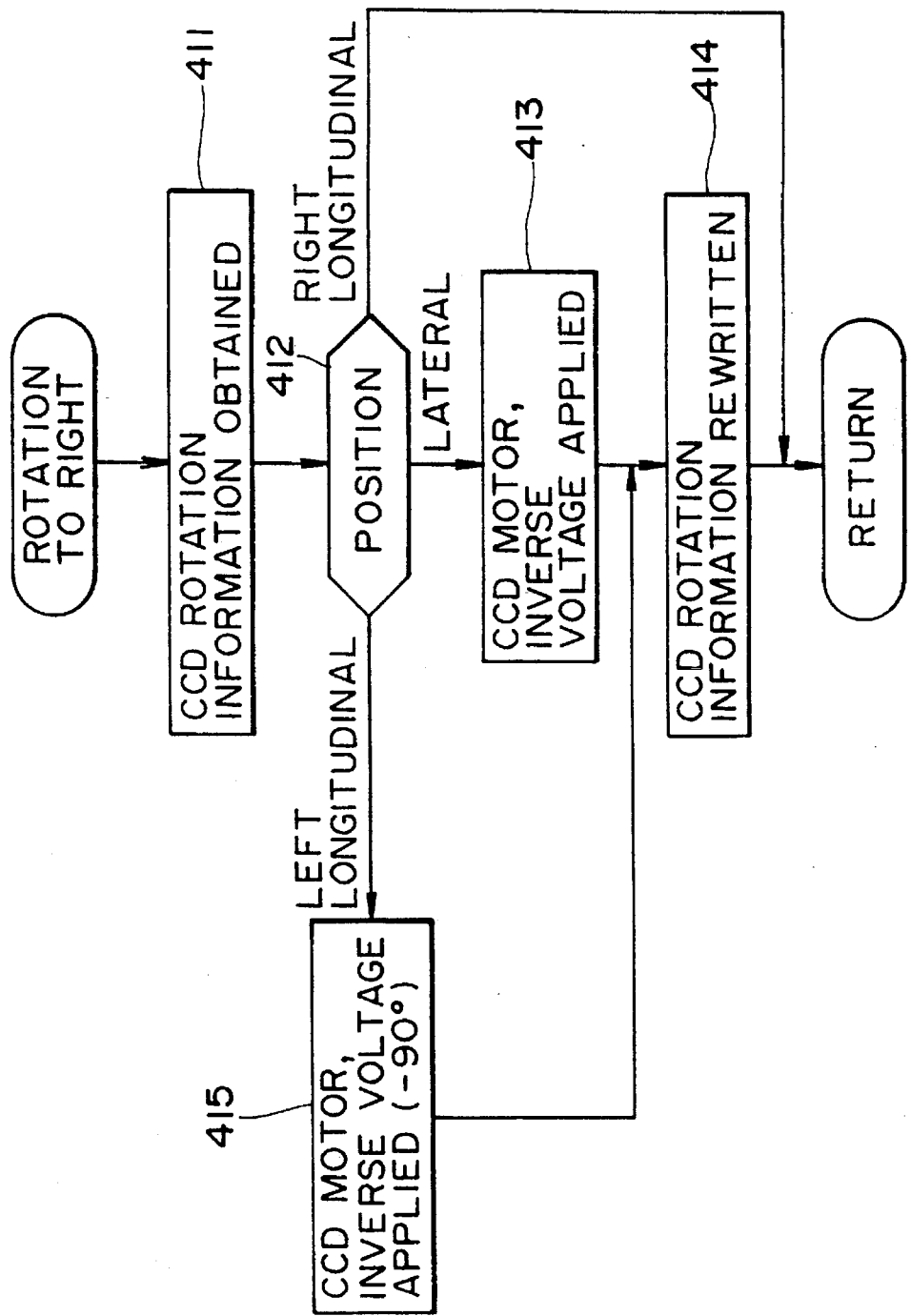
FIG. 23 is a flow chart showing the rightward rotation control performed when the rotation command button of the operation part is operated.

FIG. 23 is the flow chart showing the rightward rotation control performed when the rotation command button 346H is operated.

As shown in FIG. 23, first, the rotating position information of the CCD 316 is taken in from the rotating position detecting part 342 (Step 411). Then, when the rotating position information of the CCD 316 is judged to be the lateral position in Step 412, a backward voltage is applied to the CCD motor to rotate the CCD 316 through 90° in the CCW direction (Step 413). With this operation, the picture on the screen of the video monitor is rotated through 90° to the right. Then, the CCD rotating position information is rewritten to the right longitudinal position, and thereafter, the process returns to the start shown in FIG. 21.

Furthermore, when the rotating position information of the CCD 316 is judged to be the left longitudinal position in Step 412, similarly to Step 413, the backward voltage is applied to the CCD motor to rotate the CCD 316 through 90° in the CCW direction (Step 415). Then, the CCD rotating position information is rewritten to the lateral position (Step 414), and thereafter, the process returns to the start shown in FIG. 21.

On the other hand, when the rotating position information of the CCD 316 is judged to be the right longitudinal position in Step 412, the CCD 316 cannot be rotated in the CCW direction. In this case, the process immediately returns to the start shown in FIG. 21.

(Standard reproduction)

Figure 24:
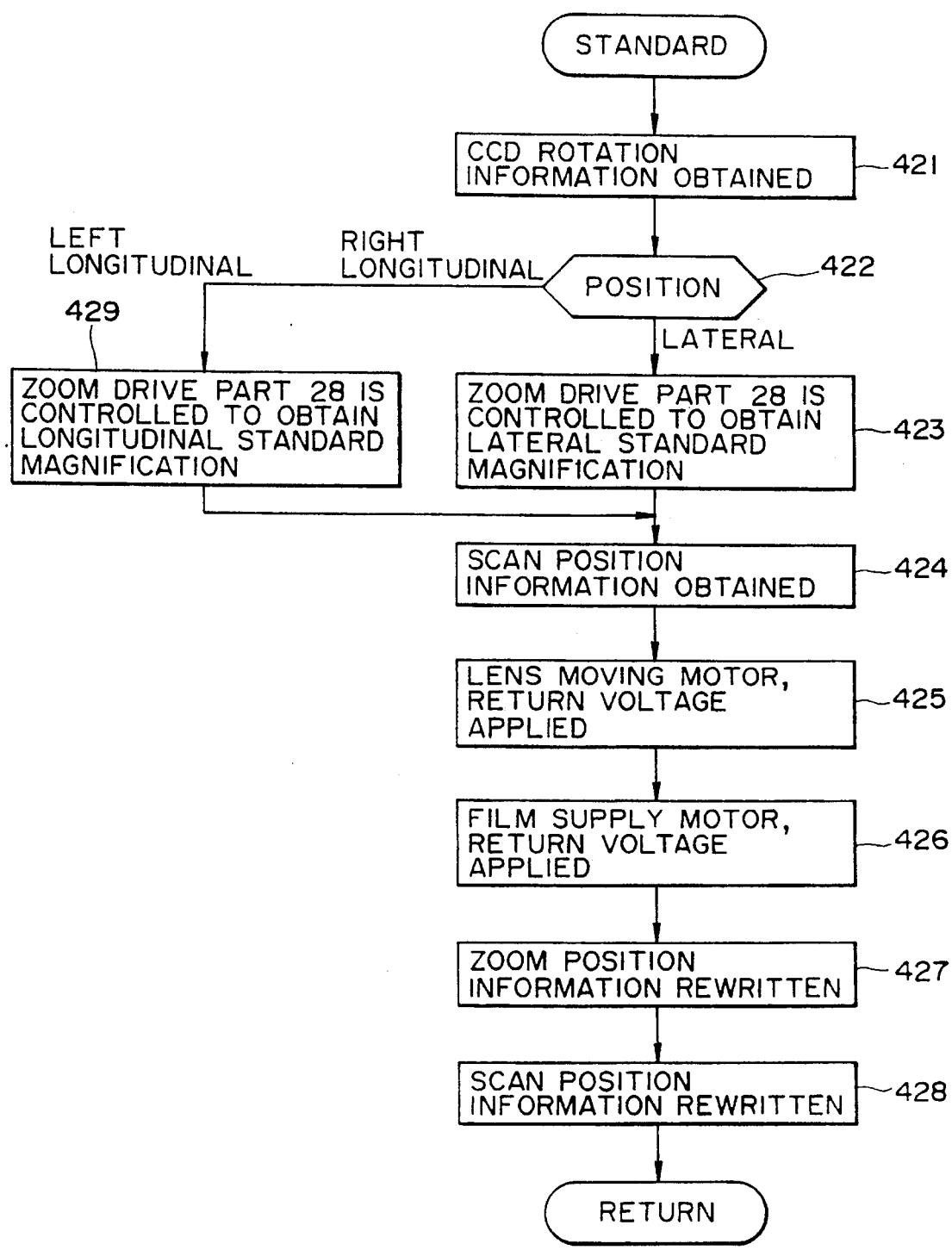
FIG. 24 is a flow chart showing the standard reproduction control performed when a standard button of the operation part is operated.

FIG. 24 is the flow chart showing the standard reproduction control performed when the standard button 351 is operated.

As shown in FIG. 24, the rotating position information of the CCD 316 is taken in from the rotating position detecting part 342 (Step 421). Then, when the rotating position information of the CCD 316 is judged to be the lateral position in Step 422, the zoom driving part 328 is controlled to make the magnification of the taking lens 314 become the lateral standard magnification. Namely, the zoom driving part 328 is controlled to make the zoom position detected by the zoom position detecting part 330 become the lateral standard magnification. Namely, the zoom driving part 328 is controlled to make the zoom position detected by the zoom position detecting part 330 become the zoom position corresponding to the lateral standard magnification (Step 423).

Subsequently, information regarding the respective moving positions at present, i.e. the scan position information is taken in from a first scan position detecting means, not shown, for detecting the moving position in the vertical direction of the taking lens 314 and a second scan position detecting means, not shown, for detecting the moving position of the film 324 in reference to the position at which the frame detected (Step 424). A voltage is applied to a lens moving motor of the longitudinal lens driving part 338 to make the scan position become the standard position (position at which the optical axis of the taking lens 314 coincides with the center of the frame) on the basis of this scan position information, and a voltage is applied to a film feeding motor of the lateral film driving part 334 (Steps 425, 426). With these operations, the film image is reproduced on the screen of the video monitor 319 in the lateral standard condition.

Then, the zoom position information and the scan position information are rewritten (Steps 427, 428), and thereafter, the process returns to the start shown in FIG. 21.

On the other hand, when the rotating position information of the CCD 316 is judged to be the left longitudinal position or the right longitudinal position, the zoom driving part 328 is controlled to make the magnification of the taking lens 314 become the longitudinal standard magnification (Step 429), and thereafter, similarly to the above, the process proceeds from Step 424 to 428. With this operation, the film image is reproduced on the screen of the video monitor 319 in the longitudinal standard condition.

(Scan)

FIGS. 25 through 33 are the flow charts showing the scan control when at least one of the scan buttons 346C, 346D, 346E and 346F is operated.

Figure 25:
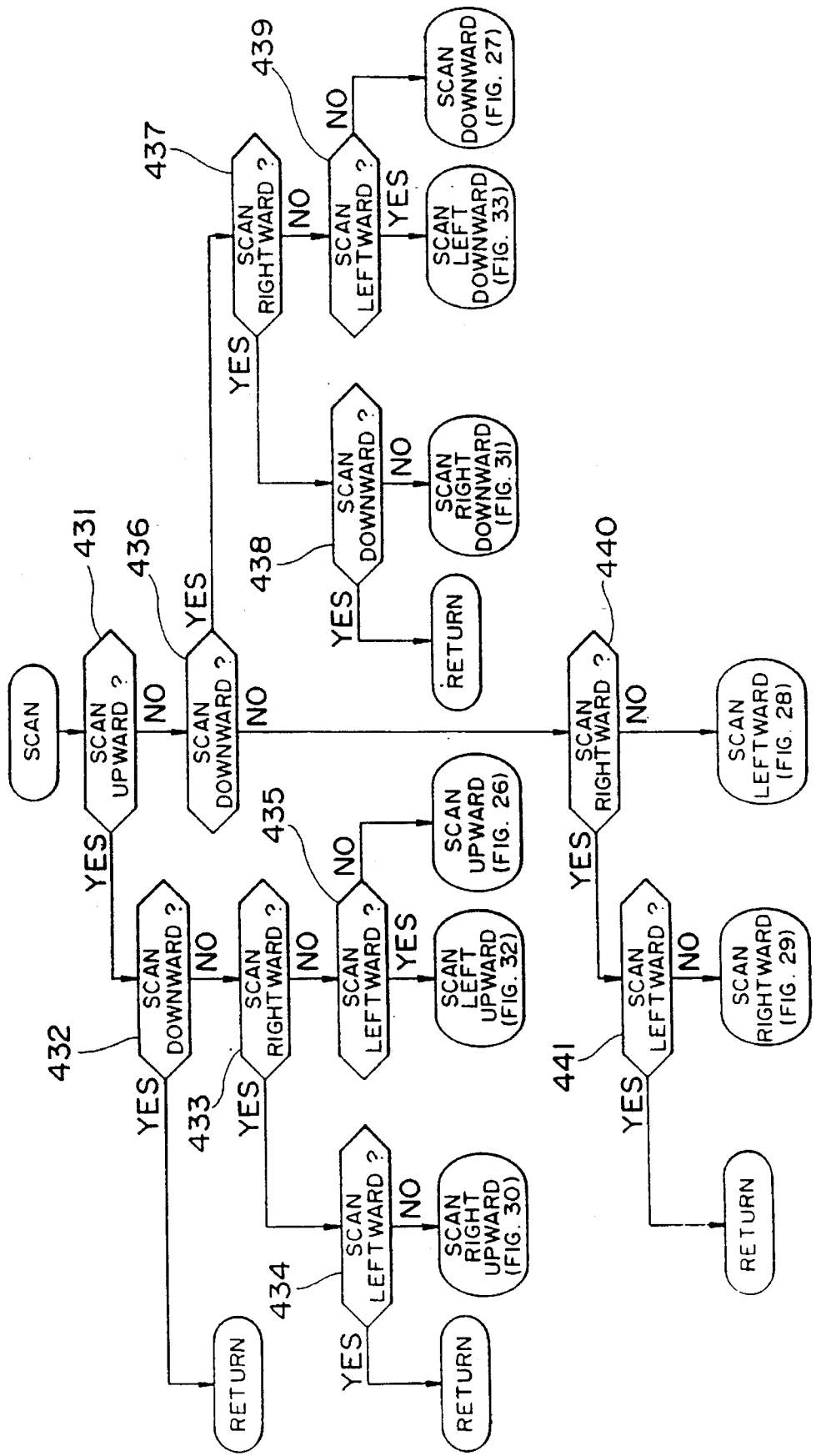
FIG. 25 is a flow chart for discriminating as to which button out of the scan buttons of the operation part is operated.

FIG. 25 is the flow chart for discriminating as to which button out of the scan buttons 346C, 346D, 346E and 346F is operated. The control part 332 performs scans in eight directions including upward, downward, leftward, rightward, right upward, right downward, left upward and left downward directions in accordance with the button operations.

As shown in FIG. 25, first, discrimination is made as to whether the upward scan button 346C is on or not (Step 431), and, when "on" is discriminated, subsequently, discrimination is made as to whether the downward scan button 346D is on or not (Step 432), and here, when "on" is discriminated, the scans of the upward and the downward direction opposing to each other are commanded, whereby the process returns with no scan.

Figure 30:
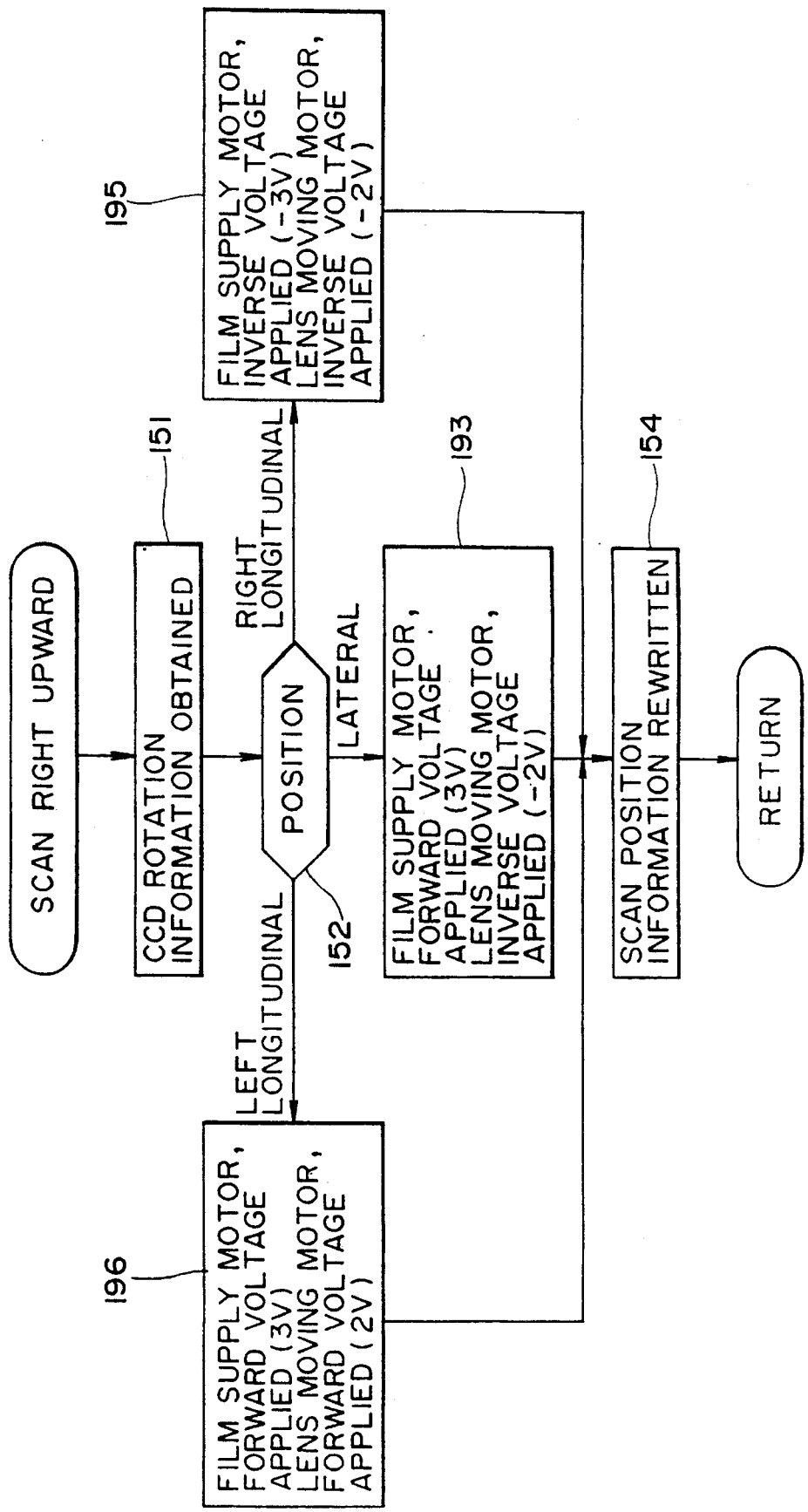
FIG. 30 is a flow chart showing the control for scan in a right upward direction.

On the other hand, when "off" is discriminated in Step 432, subsequently, discrimination is made as to whether the rightward scan button 346F is on or not (Step 433), and, when "on" is discriminated, further, discrimination is made as to whether the leftward scan button 346E is on or not (Step 434). Here, when "on" is discriminated, scans in the rightward direction and the leftward direction opposing to each other are commanded, whereby the process returns with no scan. On the other hand, when "off" is discriminated in Step 434, it means that only the upward scan button 346C and the rightward scan button 346F are on, whereby the right upward scan shown in FIG. 30 is performed.

Figure 32:
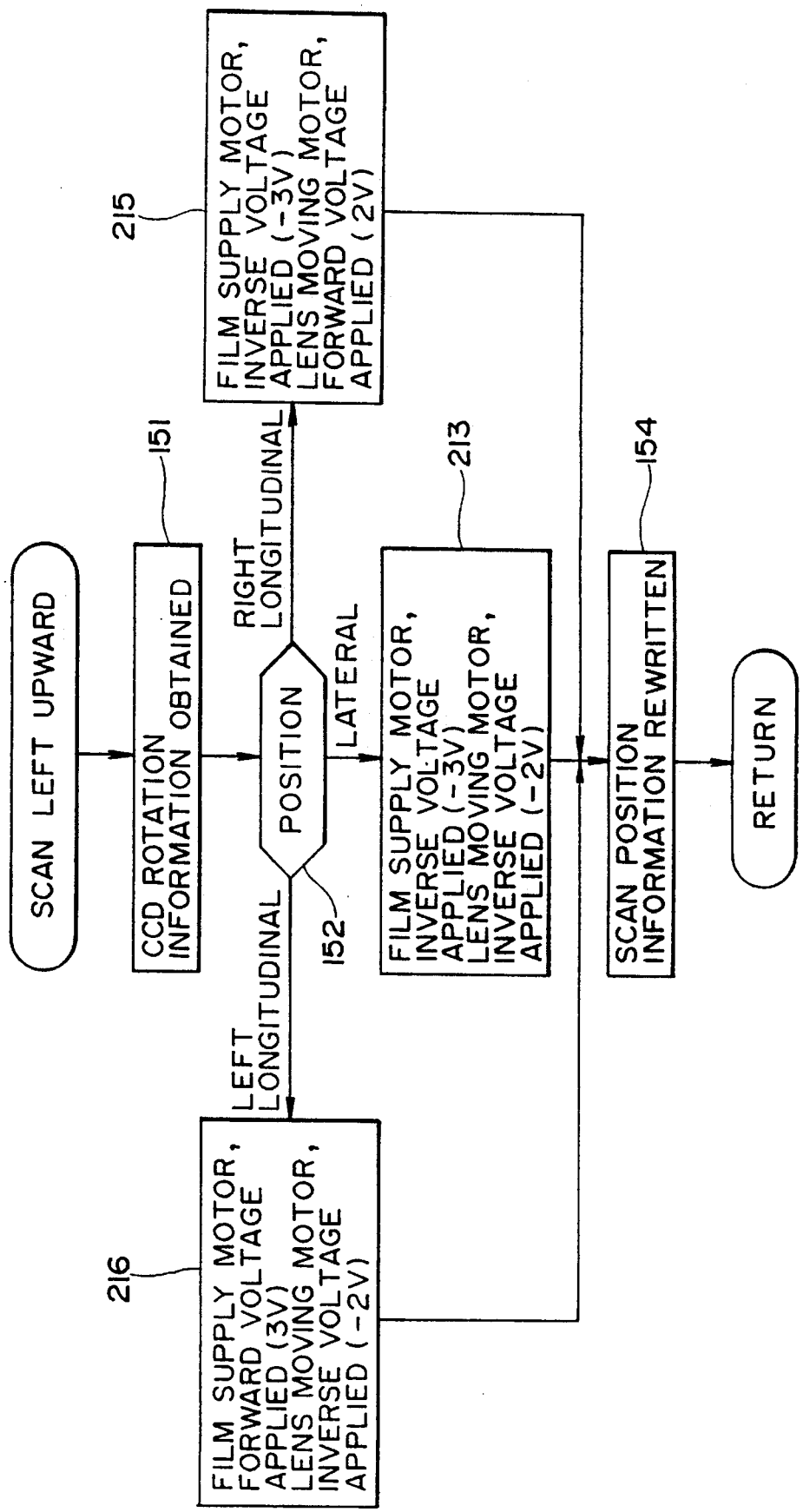
FIG. 32 is a flow chart showing the control for scan in a left upward direction.

Furthermore, when "off" is discriminated in Step 433, subsequently, discrimination is made as to whether the leftward scan button 364E is on or not (Step 435). When "on" is discriminated, it means that only the upward scan button 346C and the leftward scan button 346E are on, whereby the left upward scan shown in FIG. 32 is performed. On the other hand, when "off" is discriminated in Step 435, it means that only the upward scan button 346C is on, whereby the upward scan shown in FIG. 26 is performed.

Figure 31:
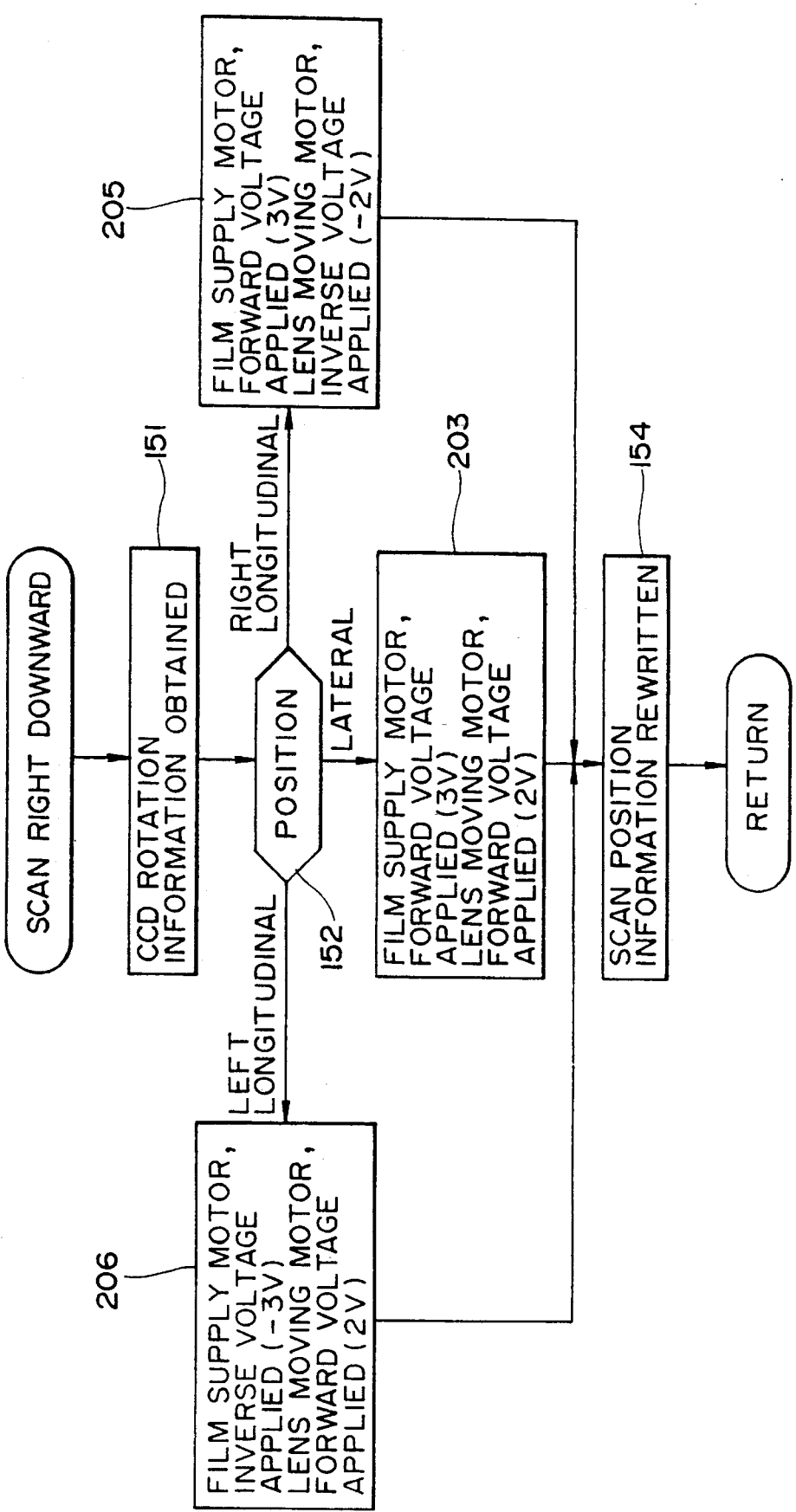
FIG. 31 is a flow chart showing the control for scan in a right downward direction.

On the other hand, when "off" is discriminated in Step 431, subsequently, discrimination is made as to whether the downward scan button 346D is on or not (Step 436). Here, when "on" is discriminated, subsequently, discrimination is made as to whether the rightward scan button 346F is on or not (Step 437). When "on" is discriminated, further, discrimination is made as to whether the leftward scan button 346E is on or not (Step 438). Here, when "on" is discriminated, since the rightward scan and the leftward scan opposing to each other are commanded, the process returns without scan. On the other hand, "off" is discriminated in Step 438, it means that only the downward scan button 346D and the rightward scan button 346F are on, whereby the right downward scan shown in FIG. 31 is performed.

Figure 27:
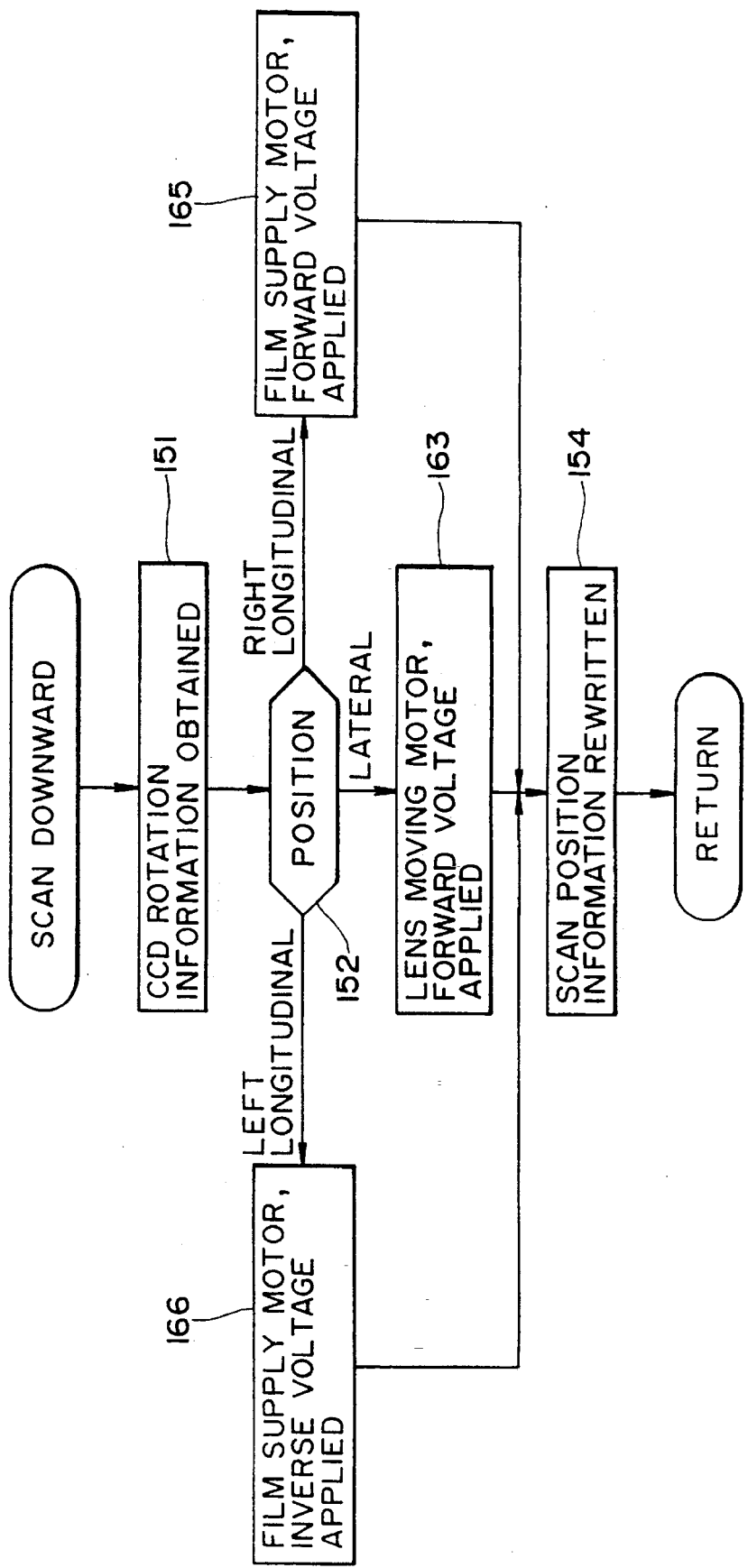
FIG. 27 is a flow chart showing the control for scan in a downward direction.
Figure 33:
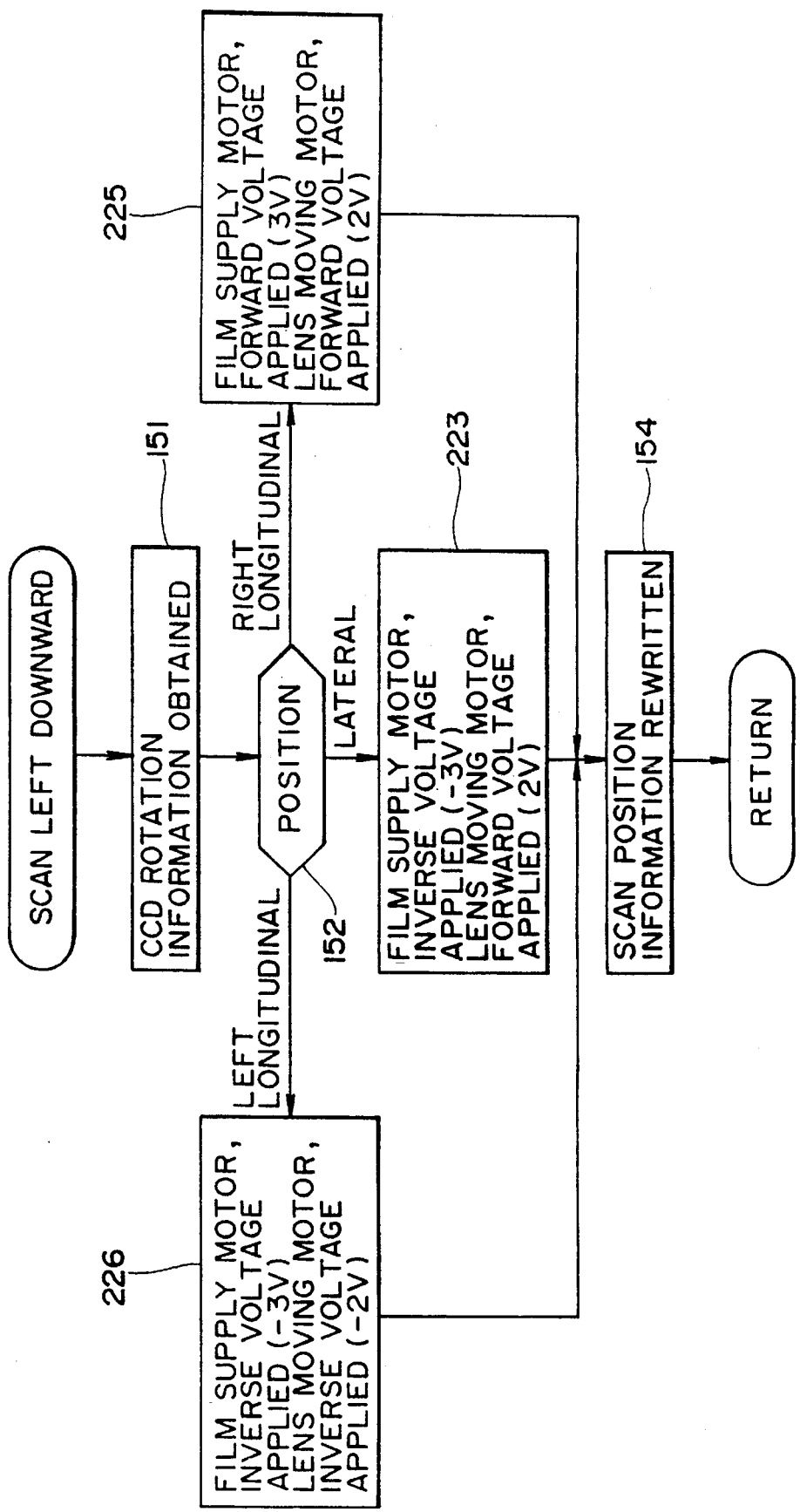
FIG. 33 is a flow chart showing the control for scan in a left downward direction.

Furthermore, when "off" is discriminated in Step 437, subsequently, discrimination is made as to whether the left scan button 346E is on or not (Step 439). When "on" is discriminated, it means that only the downward scan button 346D and the leftward scan button 346E are on, whereby the left downward scan shown in FIG. 33 is performed. On the other hand, "off" is discriminated in Step 439, it means that only the downward scan button 346D is on, whereby the downward scan shown in FIG. 27 is performed.

Figure 26:
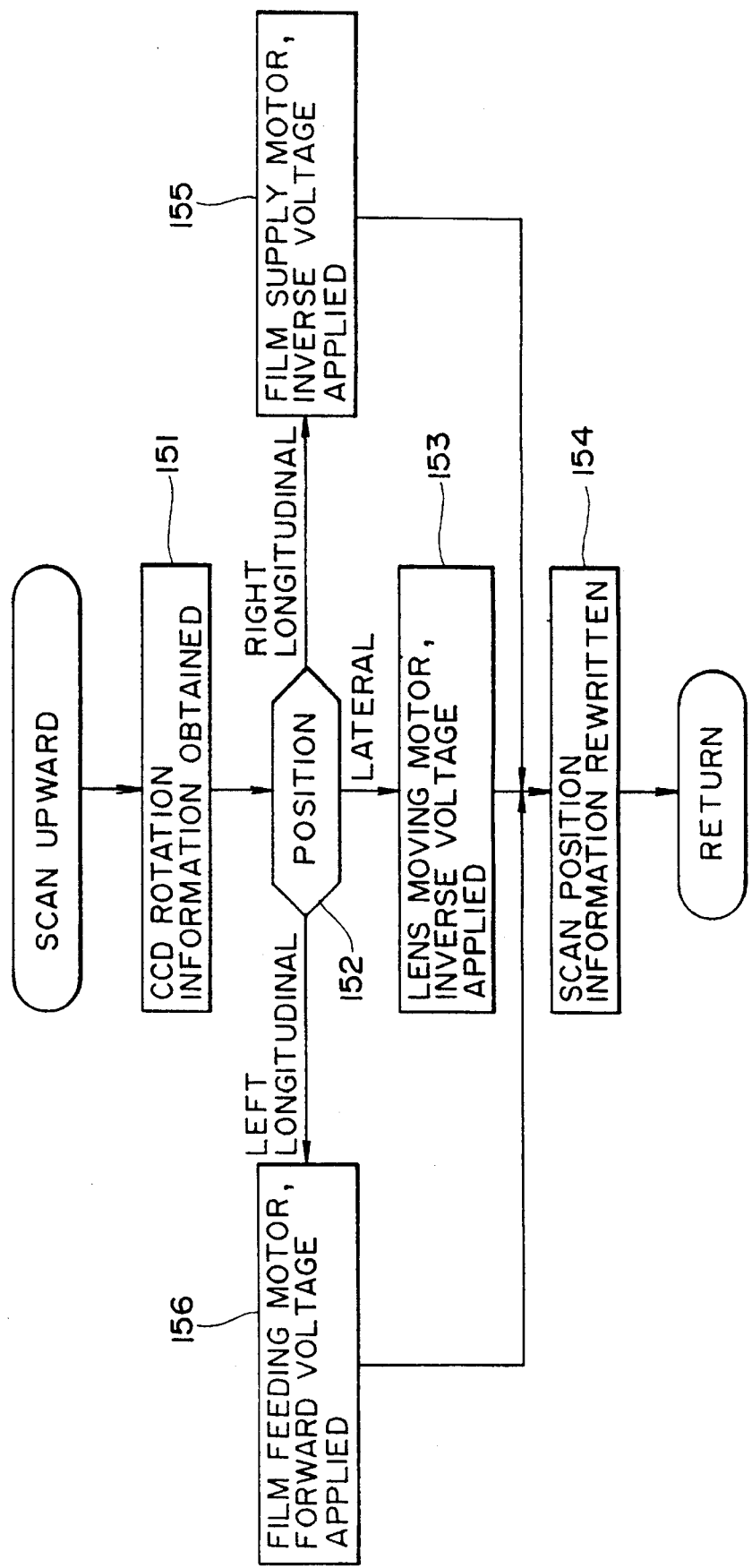
FIG. 26 is a flow chart showing the control for scan in an upward direction.

FIG. 26 is the flow chart showing the control of the upward scan.

As shown in FIG. 26, first, the rotating position information of the CCD 316 is taken in from the rotating position detecting part 342 (Step 451). Then, when the rotating position information of the CCD 316 is judged to be the lateral position in Step 452, the backward voltage is applied to the lens moving motor to move the taking lens 314 downwardly (Step 453). With this operation, the picture on the screen of the video monitor moves upwardly. Then, the scan position information is rewritten (Step 454), and thereafter, the process returns to the start shown in FIG. 21.

Furthermore, when the rotating position information of the CCD 316 is judged to be the right longitudinal position in Step 452, the backward voltage is applied to the film feeding motor to move the film in the backward direction, whereby the picture on the screen of a TV is moved upwardly (Step 455). Then, the scan position information is rewritten (Step 454), and thereafter, the process returns to the start shown in FIG. 21.

On the other hand, when the rotating position information of the CCD 316 is judged to be the left longitudinal position in Step 452, the forward voltage is applied to the film feeding motor to move the film in the forward direction, whereby the picture on the screen of the TV is moved upwardly (Step 456). Then, the scan position information is rewritten (Step 454), and thereafter, the process returns to the start shown in FIG. 21.

FIG. 27 is the flow chart showing the control of the downward scan. Incidentally, Steps common with those in FIG. 26 are denoted by the same reference numerals, and the detailed description thereof will be omitted.

Since the downward scans are reverse in scan direction to the upward scans, the voltages applied to the motors in Steps 463, 465 and 466 are reverse in polarity to the voltages applied to the motors in Steps 453, 455 and 456 as shown in FIG. 26.

Figure 28:
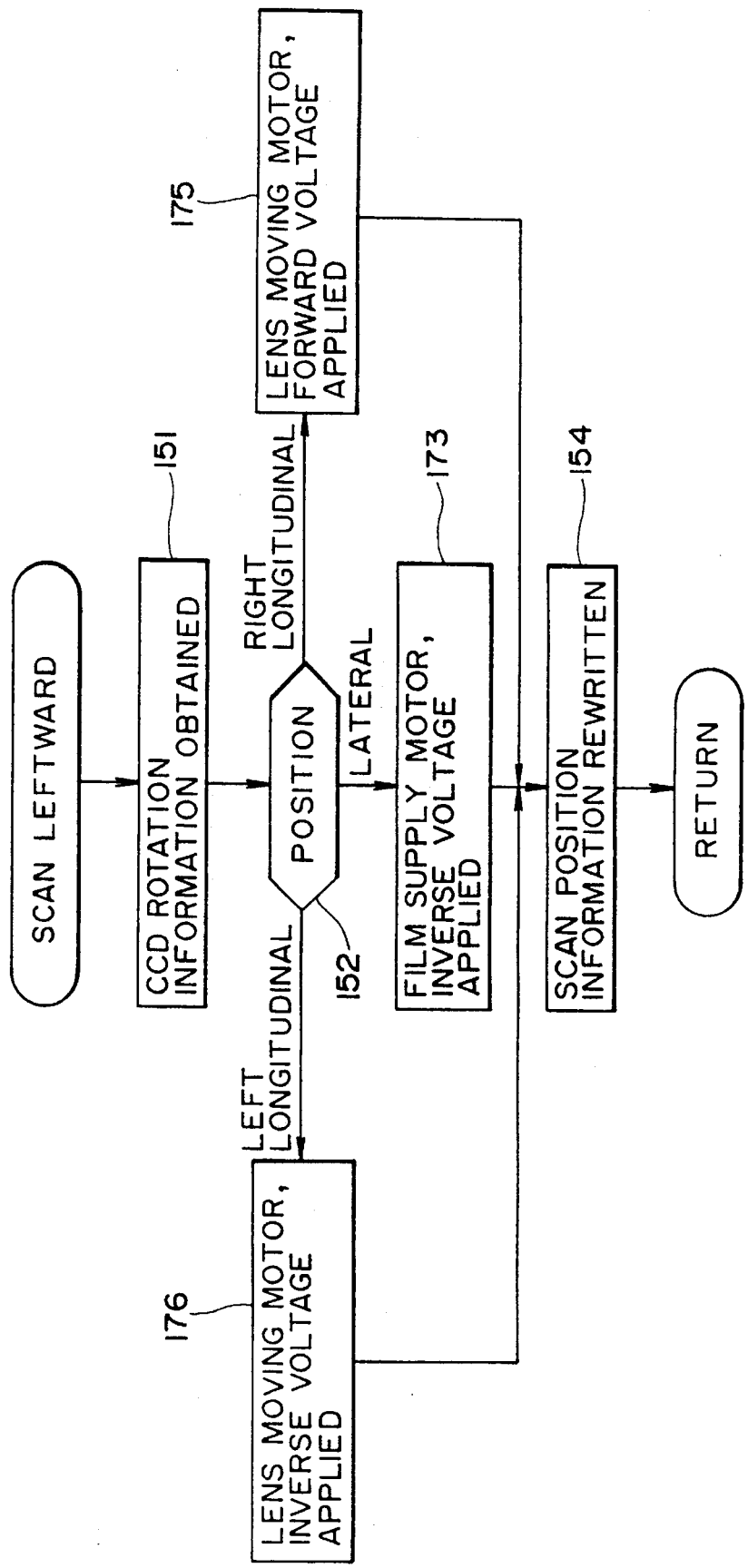
FIG. 28 is a flow chart showing the control for scan in a leftward direction.

FIG. 28 is the flow chart showing the control of the leftward scan. Incidentally, Steps common with those in FIG. 26 are denoted by the same reference numerals, and the detailed description thereof will be omitted.

In FIG. 28, the rotating position information of the CCD 316 is judged to be the lateral position in Step 452, the backward voltage is applied to the film feeding motor to move the film in the backward direction, whereby the picture on the screen of the video monitor is moved leftwardly (Step 473).

Furthermore, when the rotating position information of the CCD 316 is judged to be the right longitudinal position, the forward voltage is applied to the lens moving motor, whereby the picture on the screen of the video monitor is moved leftwardly (Step 475).

On the other hand, when the rotating position information of the CCD 316 is judged to be the left longitudinal position, the backward voltage is applied to the lens moving motor to move the taking lens downwardly, whereby the picture on the screen of the video monitor leftwardly (Step 476).

Figure 29:
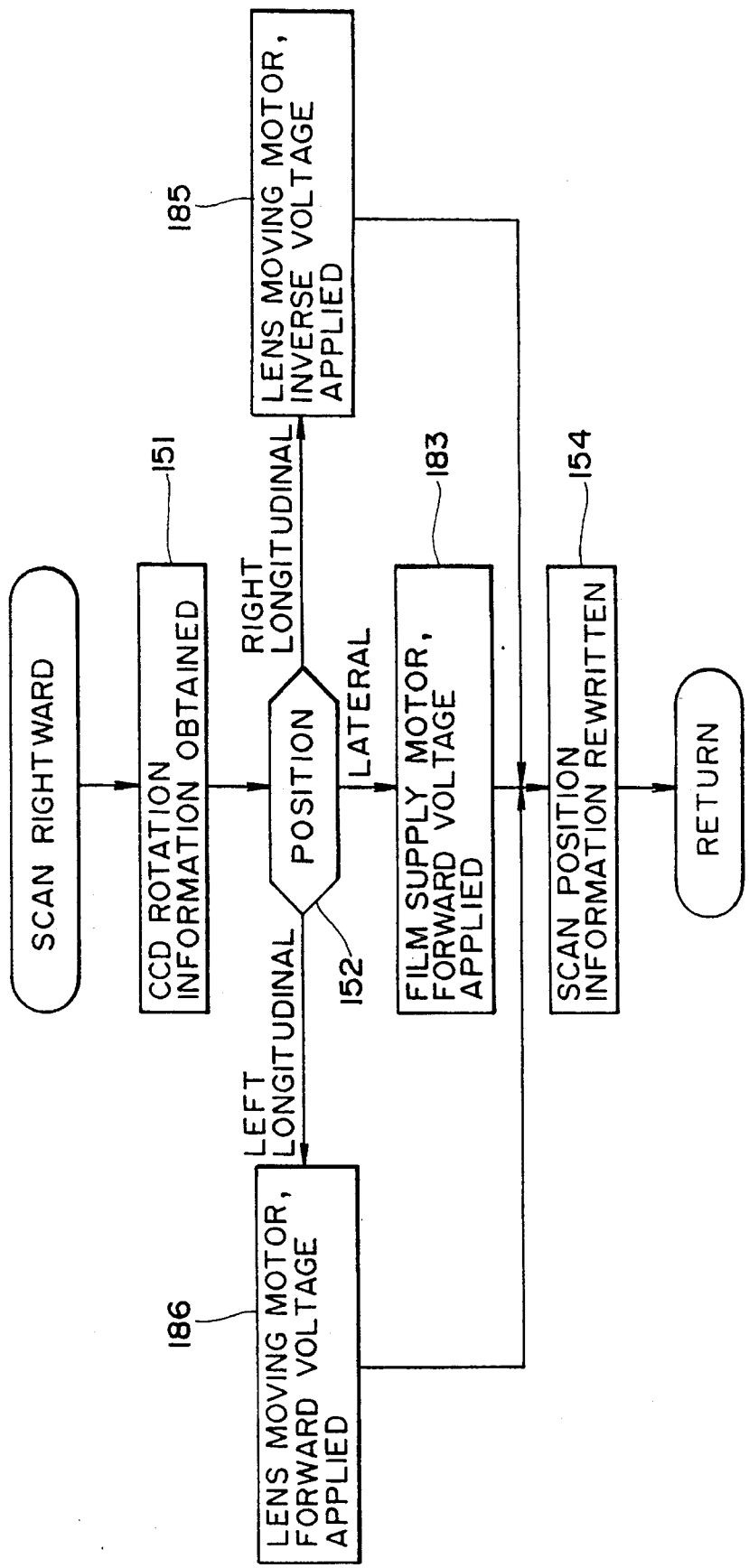
FIG. 29 is a flow chart showing the control for scan in a rightward direction.

FIG. 29 is the flow chart showing the control of the rightward scan. Incidentally, Steps common with those in FIG. 26 are denoted by the same reference numerals, and the detailed description thereof will be omitted.

Since the rightward scans are reverse in scan direction to the leftward scans, the voltages applied to the motors in Steps 483, 485 and 486 are reverse in polarity to the voltages applied to the motors in Steps 473, 475 and 476 as shown in FIG. 28.

(Scan in oblique directions)

FIGS. 30 through 33 are flow charts showing the controls of scans in the oblique directions, respectively. FIG. 30 is the flow chart showing the control of the scan in the right upward direction. Incidentally, Steps common with those in FIG. 26 are denoted by the same reference numerals, and the detailed description thereof will be omitted.

The control of the scan in the oblique direction can be performed by simultaneous drivings of the film feeding motor and the lens moving motor. The control of the right upward scan shown in FIG. 30 is achieved by simultaneously performing the upward scan control (Refer to FIG. 26) and the rightward scan control (Refer to FIG. 29).

Namely, in FIG. 30, when the rotating position information of the CCD 316 is judged to be the lateral position in Step 452. the forward voltage (3 V) is applied to the film feeding motor to move the film in the forward direction, and simultaneously, the backward voltage (–2 V) is applied to the lens moving motor to move the taking lens downwardly, whereby the picture on the screen of the video monitor is moved right-upwardly (Step 493).

Here, assumption is made that the film feeding motor the lens moving motor change the rotating speeds in proportion to the voltage values applied thereto, respectively and the rotating directions thereof are changed in accordance with the polarities of the applied voltages, and further, when the voltages equal to each other are applied to the film feeding motor and the lens moving motor, the film feeding speed and the lens moving speed become equal to each other. In this case, as described above, when a voltage of 3 V is applied to the film feeding motor, for example, and a voltage of –2 V is applied to the lens moving motor, for example, a ratio between the upward speed and the rightward speed becomes 2:3. As described above, when the ratio between the speeds coinciding with the aspect ratio of the frame are selected, the picture on the screen of the video monitor can be moved from the center of the frame to the right upward corner in a straight line.

Similarly, when the rotating position information of the CCD 316 is judged to be the right longitudinal position, the backward voltage (–3 V) is applied to the film feeding motor to move the film in the backward direction, and simultaneously, the backward voltage (–2 V) is applied to the lens moving motor to move the taking lens downwardly, whereby the picture on the screen of the video monitor is moved right-upwardly (Step 495).

Furthermore, when the rotating position information of the CCD 316 is judged to be the left longitudinal position, the forward voltage (3 V) is applied to the film feeding motor to move the film in the forward direction, and simultaneously, the forward voltage (2 V) is applied to the lens moving motor to move the taking lens upwardly, whereby the picture on the screen of the video monitor is moved right-upwardly (Step 496).

FIG. 31 is the flow chart showing the downward scan control. Incidentally, Steps common with those in FIG. 26 are denoted by the same reference numerals, and the detailed description will be omitted.

In FIG. 31, when the rotating position information of the CCD 316 is judged to be the lateral position, the forward voltage (3 V) is applied to the film feeding motor to move the film in the forward direction, and simultaneously, the forward voltage (2 V) is applied to the lens moving motor to move the taking lens upwardly, whereby the picture on the screen of the video monitor is moved right-downwardly (Step 503).

Similarly, when the rotating position information of the CCD 316 is judged to be the right longitudinal position, the forward voltage (3 V) is applied to the film feeding motor to move the film in the forward direction, and simultaneously, the backward voltage (–2 V) is applied to the lens moving motor to move the taking lens downwardly, whereby the picture on the screen of the video monitor right-downwardly (Step 505). Furthermore, when the rotating position information of the CCD 316 is judged to be the left longitudinal position in Step 452, the backward voltage (–3 V) is applied to the film feeding motor to move the film in the backward direction, and simultaneously, the forward voltage (2 V) is applied to the lens moving motor to move the taking lens upwardly, whereby the picture on the screen of the video monitor is moved right-downwardly (Step 506).

FIG. 32 is the flow chart showing the control of the left upward scan. Incidentally, Steps common with those in FIG. 26 are denoted by the same reference numerals, and the detailed description will be omitted.

In FIG. 32, when the rotating position information of the CCD 316 is judged to be the lateral position in Step 452, the backward voltage (−3 V) is applied to the film feeding motor to move the film in the backward direction, and simultaneously, the backward voltage (−2 V) is applied to the lens moving motor to move the taking lens downwardly, whereby the picture on the screen of the video monitor is moved left-upwardly (Step 513).

Similarly, the rotating position information of the CCD 316 is judged to be the right longitudinal position in Step 452, the backward voltage (−3 V) is applied to the film feeding motor to move the film in the backward direction, and simultaneously, the forward voltage (2 V) is applied to the lens moving motor to move the taking lens upwardly, whereby the picture on the screen of the video monitor is moved left-upwardly (Step 515).

Furthermore, when the rotating position information of the CCD 316 is judged to be the left longitudinal position in Step 452, the forward voltage (3 V) is applied to the film feeding motor to move the film in the forward direction, and simultaneously, the backward voltage (−2 V) is applied to the lens moving motor to move the taking lens downwardly, whereby the picture on the screen of the video monitor is moved left-upwardly (Step 516).

FIG. 33 is the flow chart showing the control of the left-downward scan. Incidentally, Steps common with those in FIG. 26 are denoted by the same reference numerals, and the detailed description will be omitted.

In FIG. 33, when the rotating position information of the CCD 316 is judged to be the lateral position in Step 452, the backward voltage (−3 V) is applied to the film feeding motor to move the film in the backward direction, and simultaneously, the forward voltage (2 V) is applied to the lens moving motor to move the taking lens upwardly, whereby the picture on the screen of the video monitor is moved left-downwardly (Step 523).

Similarly, when the rotating position information of the CCD 316 is judged to be the right longitudinal position in Step 452, the forward voltage (3 V) is applied to the film feeding motor to move the film in the forward direction, and simultaneously, the forward voltage (2 V) is applied to the lens moving motor to move the taking lens upwardly, whereby the picture on the screen of the video monitor is moved left-downwardly (Step 525).

Furthermore, when the rotating position information of the CCD 316 is judged to be the left longitudinal position in Step 452, the backward voltage (−3 V) is applied to the film feeding motor to move the film in the backward direction, and simultaneously, the backward voltage (−2 V) is applied to the lens moving motor to move the taking lens downwardly, whereby the picture on the screen of the video monitor is moved left-downwardly (Step 526).

Figure 34:
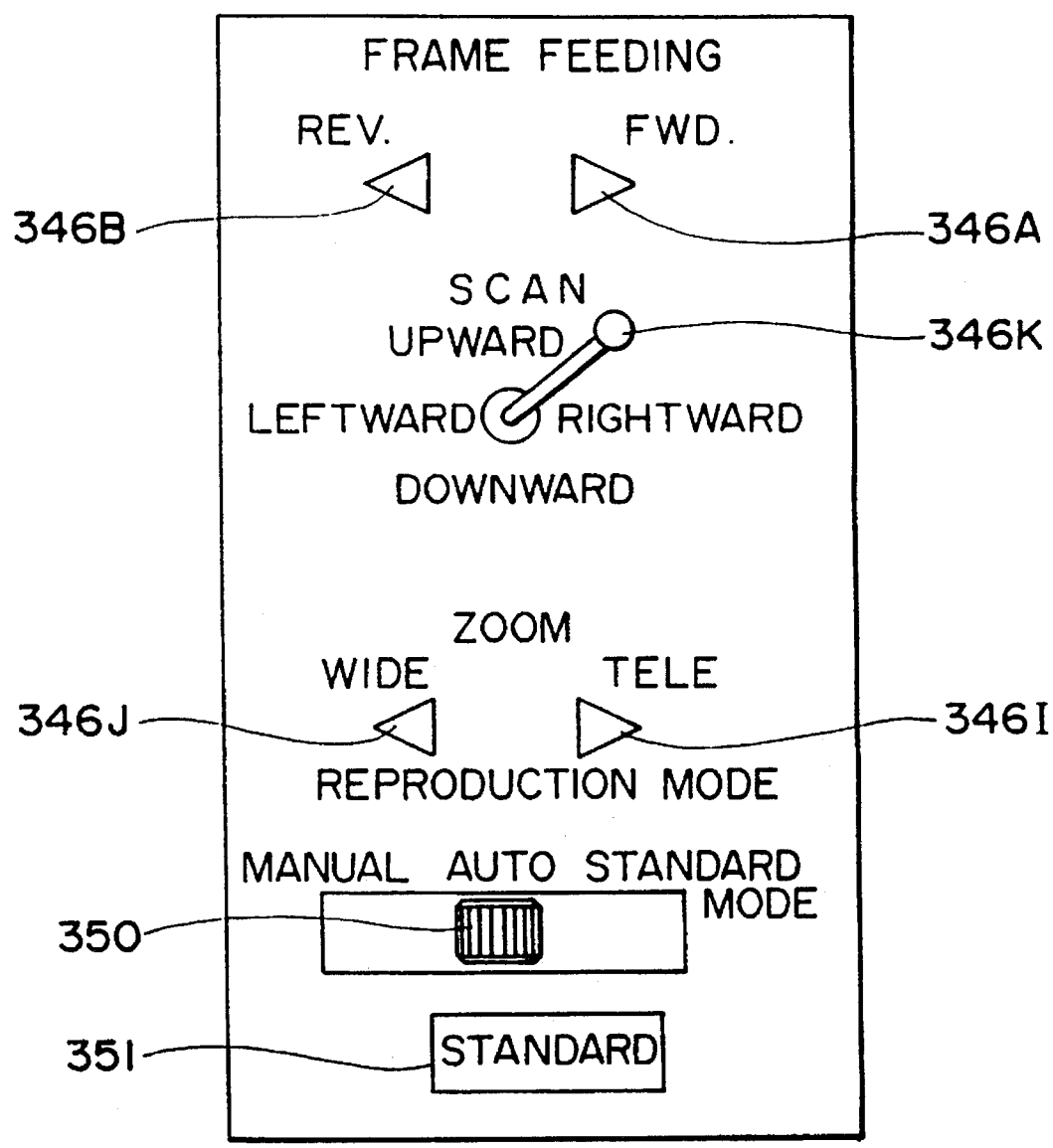
FIG. 34 is an enlarged plan view showing another embodiment of the operation part shown in FIG. 13.
Figure 35:
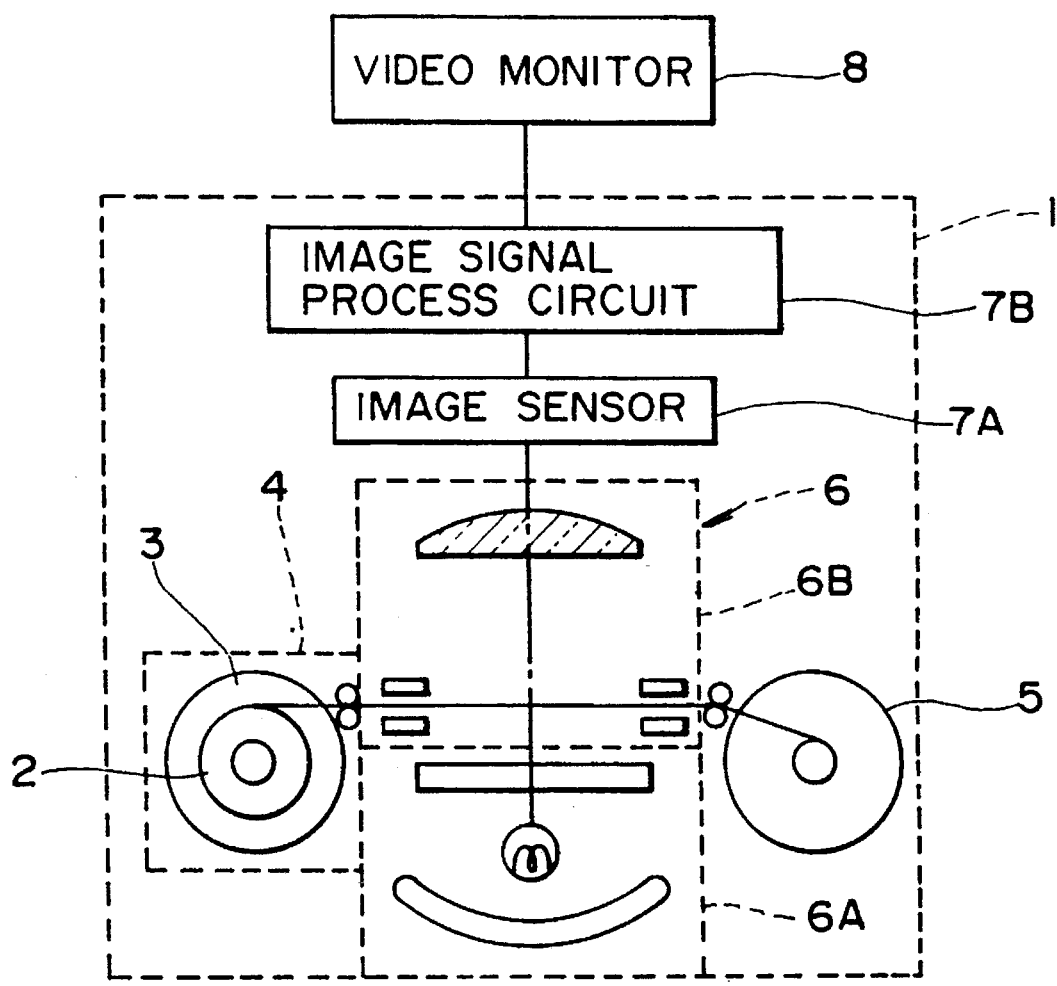
FIG. 35 is a schematic diagram showing an example of the conventional film image input system.

Incidentally, in this embodiment, the four scan buttons 346C–346F are used, however, the present invention is not limited to this, and one scan lever 346K capable of outputting scan commands in at least eight directions may be used as shown in FIG. 34. In this case, the judging shown in FIG. 25 can be dispensed with.

Furthermore, the scan speed at the time of operating the scan button and the zoom speed at the time of operating the zoom button are set at relatively low speeds because it is necessary to determine the desired scan position and zooming with the picture on the screen of the video monitor being watched. On the other hand, when the standard button 351 is operated from an optional image magnification and scan position to return them to the display of the standard condition, it is preferable to return quickly. Then, in this embodiment, the scan speed and the zoom speed at the time of returning to the display in the standard condition are set at speeds faster than the scan speed and the zoom speed at the time of operating the buttons.

As described above, in the film image input system according to the present invention, the moving speed of the screen on the video monitor can be made constant irrespective of the image magnification, and the portion other than the film image can be prevented from being monitored at the time of the scan because the scope where the scan is possible is restricted in accordance with the image magnification. Further, the scan can be easily performed in the oblique direction from an optional scan position, and particularly, when the scan is performed in the oblique direction, the control is performed such that a ratio between the vertical scan speed and the lateral scan speed is proportional to the aspect ratio of the film image, so that the scan can be performed quickly in the diagonal direction of the film image. Furthermore, since it is clearly displayed that what scope in one frame is pick-up at present, the advantage that this sets rough standards for the scan operation and the zoom operation can be offered.

Furthermore, in the film image input system according to the present invention, when the standard reproduction is commanded, the scan position is returned to the center of the film and the image magnification is returned to a predetermined magnification such that the film image in the whole frame occupies the whole screen of the film image from an optional image magnification and scan position, so that the standard reproduction can be easily performed, further, at least one of the zoom speed and the scan speed at the time of returning to the standard reproduction condition can be made faster than the zoom speed and the scan speed at the time of the manual operation, and the time of putting the film image into the screen in the standard reproduction condition after the operation of the standard reproduction command means can be greatly shortened, thus improving the handling properties.

Further, in the film image input system according to the present invention, the lighting unit is provided in the lid for putting in and taking out the film cartridge, so that the film image input system can be rendered compact in size. Furthermore, the lid can be provided on the front surface of the main body of the film image input system, so that putting in the film cartridge and taking out it from the cartridge housing part can be made easy, and other AV components can be mounted on the top of the main body of the film image input system.

Furthermore, in the film image input system according to the present invention, the three angles for determining the posture of the film guide member can be adjusted, respectively, so that the relative shift between the film surface of the developed still photo film and the taking lens can be easily adjusted. Furthermore, one point of the film guide member is positioned as the reference point by one positioning pin, so that not only the posture of the film but also the position of the film can be received within the predetermined values of error.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film image input system wherein an image of a developed still photo film is illuminated, passed through a taking lens and focused at an image sensing plane of a charge coupled device where the image is converted into electrical signals and the electrical signals are input into a video monitor, to thereby reproduce the image on a screen of the video monitor, said film image input system comprising:

a cartridge housing for housing therein a film cartridge containing the developed still photo film and for disposing the film cartridge at a predetermined position in a main body of said film image input system;

a lid movably secured to a front surface of the main body, wherein said lid is displaced for insertion and removal of the film cartridge from said cartridge housing; and a lighting unit provided in said lid, for illuminating the film, wherein said cartridge housing is provided on a rear surface of said lid.

2. A film image input system wherein a developed still photo film is illuminated by a light source to produce an image which is passed through a taking lens and focused at an image sensing plane of an image pick-up means where the image is converted into electrical signals and the electrical signals are input into a video monitor, thereby reproducing the image on a screen of the video monitor, said film image input system comprising:

a cartridge housing for housing therein a film cartridge containing the developed still photo film and for disposing the film cartridge at a predetermined position in a main body of said film image input system;

a lid movably secured to a front surface of the main body, wherein said lid is displaced for insertion and removal of the film cartridge from said cartridge housing; and locking means for locking said lid when the film cartridge is inserted in said cartridge housing and for unlocking said lid for removal of the film cartridge when the developed still photo film is completely taken-up inside the film cartridge.

3. A film image input system as recited in claim 2, wherein said locking means comprises:

a lock member (140A) provided on said lid, said lid being biased toward an open position by a first spring (144);

a rotatably supported lever (146) for engaging said lock member, wherein said lever (146) is biased by a second spring (149) toward a locking position;

a rotatably supported film sensing lever (150) biased by a third spring (152) so as to abut a surface of the developed still photo film;

a slidably supported ejector preventing plate (156) biased by a fourth spring (154) against an end of said rotatably supported film sensing lever (150) and having a slot (156A) formed therein; and a slidably supported ejector knob (160) provided on a side of said ejector preventing plate (156) opposite said rotatably supported lever (146) and aligned with said rotatably supported lever (146), wherein when the developed still photo film is completely contained inside the film cartridge, said film sensing lever (150) is rotated past the film cartridge by the third biasing spring (152) causing said ejector preventing plate (156) to move opposite the biasing direction of the fourth spring (154) so that said slidably supported ejector knob (160) is aligned with the slot (156A), and wherein when the ejector knob (160) is pushed through the slot (156A) an end of the ejector knob (160) contacts the rotatably supported lever (146) to disengage the lever (146) from the lock member (140A) whereby the lid is released and opened.

4. A film image input system as recited in claim 2, wherein said locking means comprises:

a lock member (140A) provided on said lid, said lid being biased toward an open position by a first spring (144);

a rotatably supported lever (146) for engaging said lock member, said lever (146) being biased by a second spring (149) in a locking position;

a rotatably supported film sensing lever (150), one end of said lever (150) being biased against a surface of the developed still photo film;

a switch (166) abutting against an opposite end of said lever (150), wherein when the film is completely contained in the film cartridge the lever (150) is moved past the film cartridge to activate the switch (166), said switch (166) activating a solenoid to disengage the rotatably supported lever (146) from said lock member (140A).

5. A film image input system as recited in claim 2, wherein said locking means comprises:

a lock member (140A) provided on said lid, said lid being biased toward an open position by a first spring (144);

a rotatably supported lever (146) for engaging said lock member, said lever (146) being biased by a second spring (149) in a locking position;

a supply shaft (170) connected to the film cartridge;

a rotary disc (171) connected to an end of the supply shaft;

a photo-interrupter (172) for optically detecting rotation of the rotary disc;

a counter (174) connected to the photo-interrupter for counting an amount of rotation of the rotary disc;

a computer (176) connected to the counter for computing whether the amount of rotation is sufficient to store the developed still photo film in the film cartridge and for controlling movement of said rotatably supported lever (146); and a memory means (178) for storing various data relating to the amount of rotation necessary to store the developed still photo film in the film cartridge, wherein when the computer determines that the developed still photo film is completely contained in the film cartridge the computer controls the rotatably supported lever (146) to disengage the lock member (140A) thereby opening the lid.

* * * * *